(12) United States Patent
Hovenden et al.

(10) Patent No.: US 9,826,834 B2
(45) Date of Patent: Nov. 28, 2017

(54) CABINET FOOT AND CABINET FOOT SYSTEM

(71) Applicant: A-dec, Inc., Newberg, OR (US)

(72) Inventors: David Anthony Hovenden, Salem, OR (US); Joshua D. Vail, Sherwood, OR (US)

(73) Assignee: A-dec, Inc., Newberg, OR (US)

( * ) Notice: Subject to any disclaimer, the term of this patent is extended or adjusted under 35 U.S.C. 154(b) by 0 days.

(21) Appl. No.: 15/094,918

(22) Filed: Apr. 8, 2016

(65) Prior Publication Data

US 2017/0290426 A1    Oct. 12, 2017

(51) Int. Cl.
| | |
|---|---|
| A47B 91/00 | (2006.01) |
| A47B 91/02 | (2006.01) |
| F16B 1/00 | (2006.01) |
| F16B 12/02 | (2006.01) |
| F16B 12/50 | (2006.01) |

(52) U.S. Cl.
CPC .............. *A47B 91/024* (2013.01); *F16B 1/00* (2013.01); *F16B 12/02* (2013.01); *F16B 12/50* (2013.01); *F16B 2001/0035* (2013.01)

(58) Field of Classification Search
CPC .......... A47B 91/024; F16B 1/00; F16B 12/02; F16B 12/50; F16B 2001/0035
USPC ..................................... 312/351.1
See application file for complete search history.

(56) References Cited

U.S. PATENT DOCUMENTS

| | | | | |
|---|---|---|---|---|
| 3,071,887 A | * | 1/1963 | Von Arb | .............. A47B 91/022 248/188.4 |
| 4,934,639 A | | 6/1990 | Domenig | |
| 4,941,717 A | | 7/1990 | Beaulieu | |
| 4,973,110 A | | 11/1990 | Nyquist | |
| 4,991,365 A | | 2/1991 | Jackson | |
| 5,853,237 A | * | 12/1998 | Powell | ................... A47B 47/00 312/257.1 |
| 6,155,662 A | * | 12/2000 | Fookes | ................ A47B 91/005 248/678 |
| 2001/0042286 A1 | * | 11/2001 | Henriott | ................. A47B 21/06 16/29 |
| 2004/0055230 A1 | | 3/2004 | Hendzel | |

(Continued)

FOREIGN PATENT DOCUMENTS

| | | |
|---|---|---|
| CN | 203028612 | 7/2013 |
| DE | 29501594 | 10/1995 |

(Continued)

OTHER PUBLICATIONS

"Minimum Design Loads for Buildings and Other Structures," *American Society of Civil Engineers*, ASCE/SEI 7-10, Chapter 13—Seismic Design Requirements for Nonstructural Components, pp. 111-125 (2010).

(Continued)

*Primary Examiner* — Hanh V Tran

(74) *Attorney, Agent, or Firm* — Klarquist Sparkman, LLP

(57) ABSTRACT

A foot for a cabinet comprises a body having a longitudinal axis, an upper end and a lower end, a leveler adjustably connected to the lower end of the body and mounting locations. The leveler is adjustable to vary a longitudinal dimension of the foot. The mounting locations are on the body and ferromagnetically couple one or more foundation members in place adjacent the foot. A foot system and other components are also described.

26 Claims, 20 Drawing Sheets

(56) References Cited

U.S. PATENT DOCUMENTS

| | | | | |
|---|---|---|---|---|
| 2004/0201338 A1* | 10/2004 | Mouw | B65F 1/1436 | 312/319.9 |
| 2005/0017616 A1* | 1/2005 | Rieser | F24C 15/086 | 312/351.1 |
| 2009/0184614 A1* | 7/2009 | Walsberg | A47B 91/024 | 312/351.3 |
| 2010/0176256 A1* | 7/2010 | Bove | A47B 91/024 | 248/188.4 |
| 2011/0115351 A1* | 5/2011 | McManic | A47B 45/00 | 312/270.1 |
| 2011/0148259 A1* | 6/2011 | Justis | A47B 91/024 | 312/228 |
| 2011/0187247 A1* | 8/2011 | Carter | A47B 46/00 | 312/246 |
| 2012/0013236 A1* | 1/2012 | Fan | H05K 7/1488 | 312/351.1 |
| 2012/0280607 A1* | 11/2012 | Doberstein | F25D 23/00 | 312/401 |
| 2013/0342091 A1* | 12/2013 | Walker | H05K 5/0247 | 312/265.5 |
| 2014/0312757 A1* | 10/2014 | Bridges | A47B 91/024 | 312/351.3 |
| 2016/0081474 A1* | 3/2016 | Basesme | A47L 15/4253 | 248/188.4 |

FOREIGN PATENT DOCUMENTS

| | | |
|---|---|---|
| DE | 20209410 | 9/2002 |
| EP | 2927604 | 10/2015 |
| GB | 2050152 | 1/1981 |

OTHER PUBLICATIONS

Extended Search Report for European Application No. 17165627.5, dated Jul. 31, 2017.

\* cited by examiner

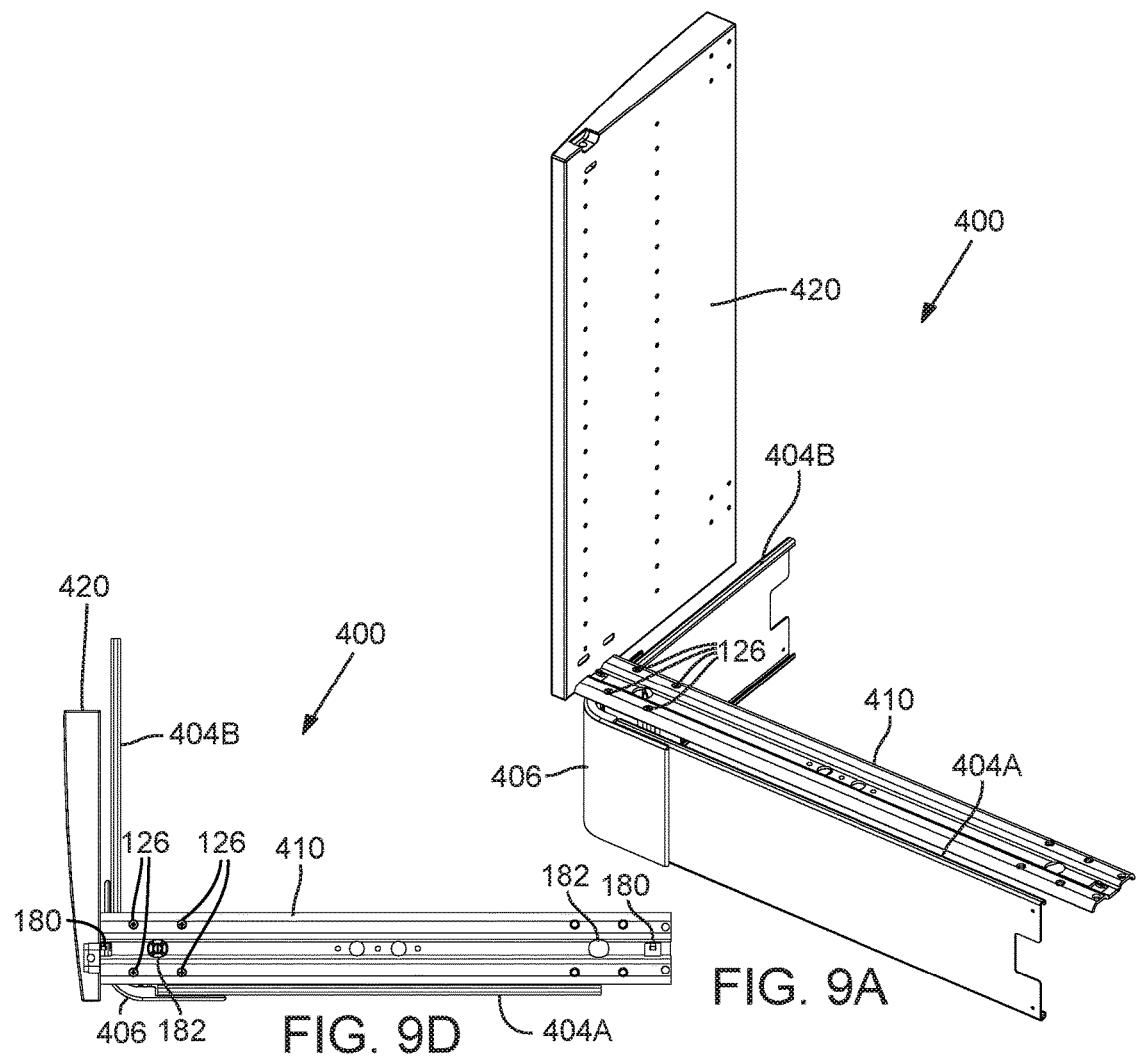
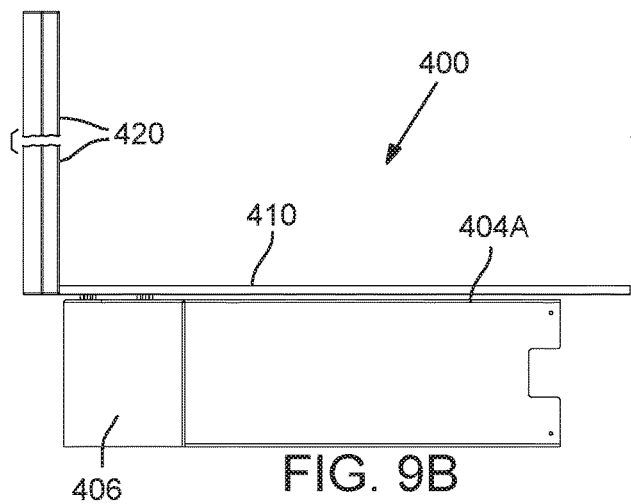
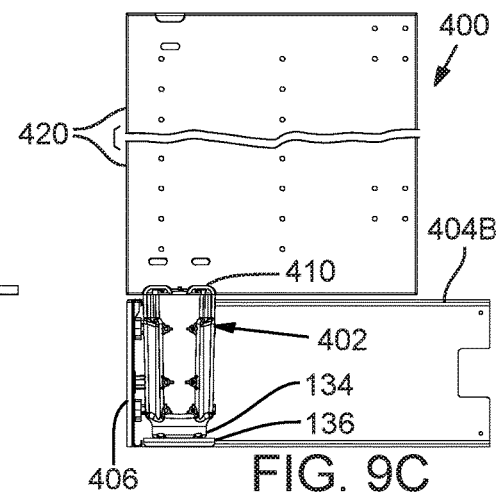

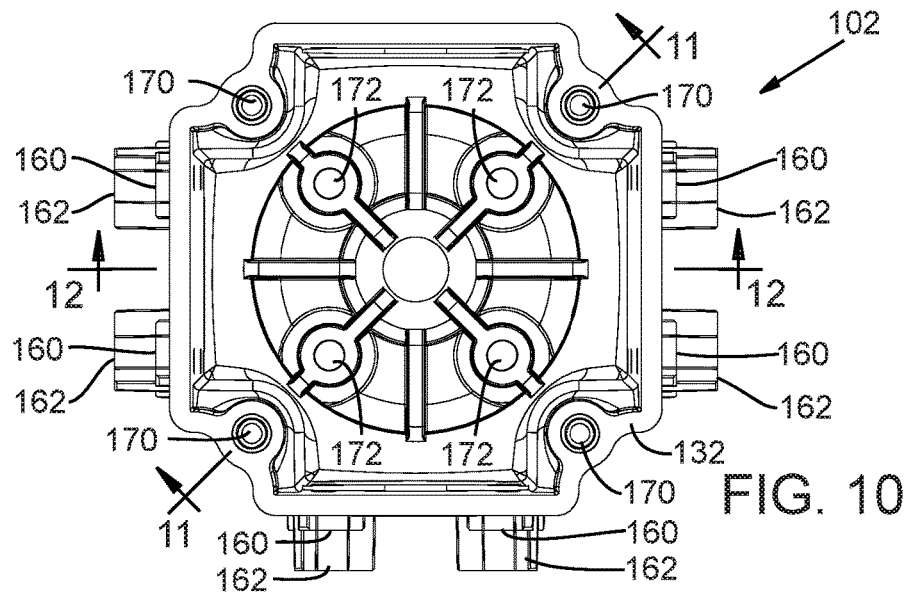
FIG. 10B
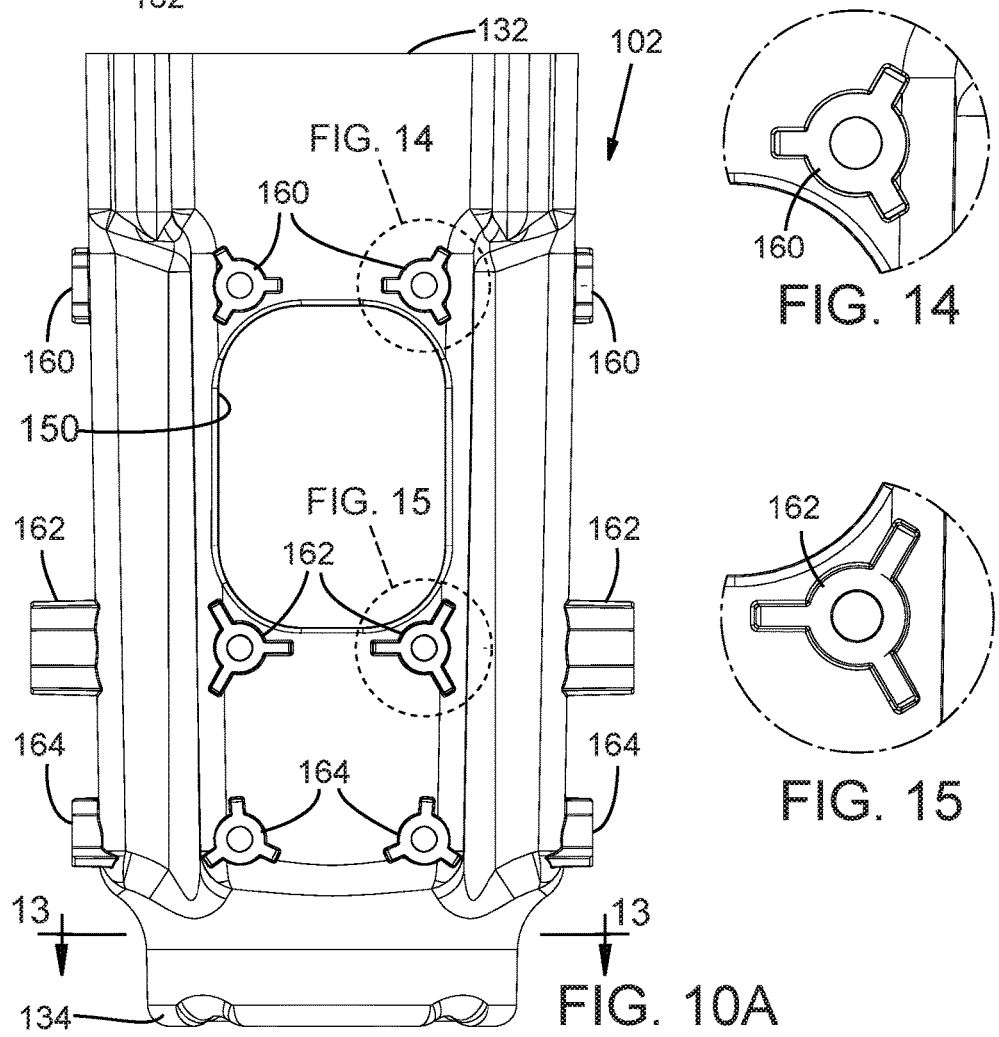
FIG. 14
FIG. 15
FIG. 10A

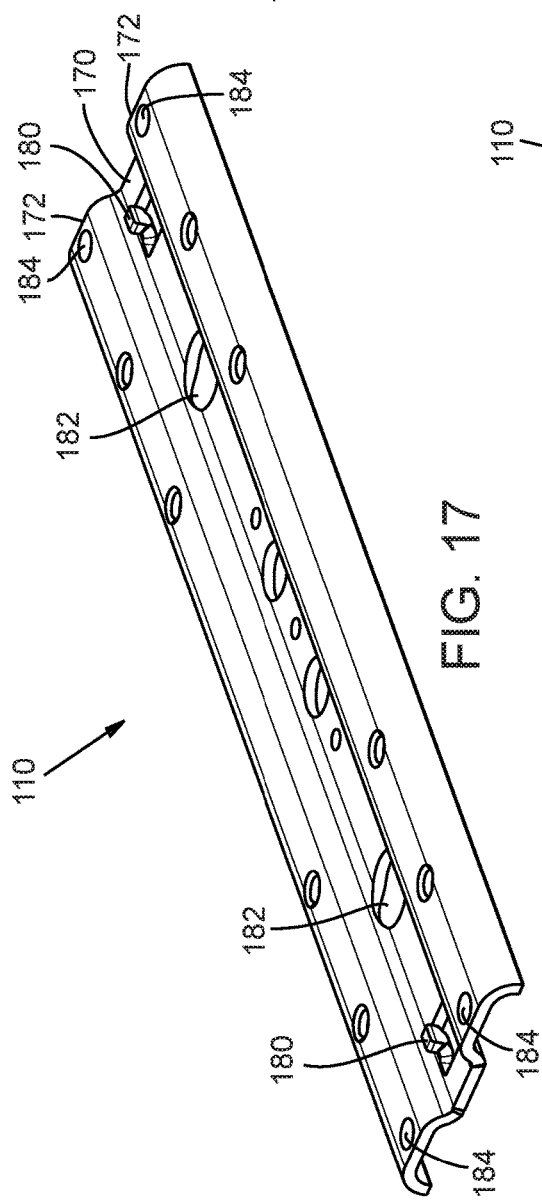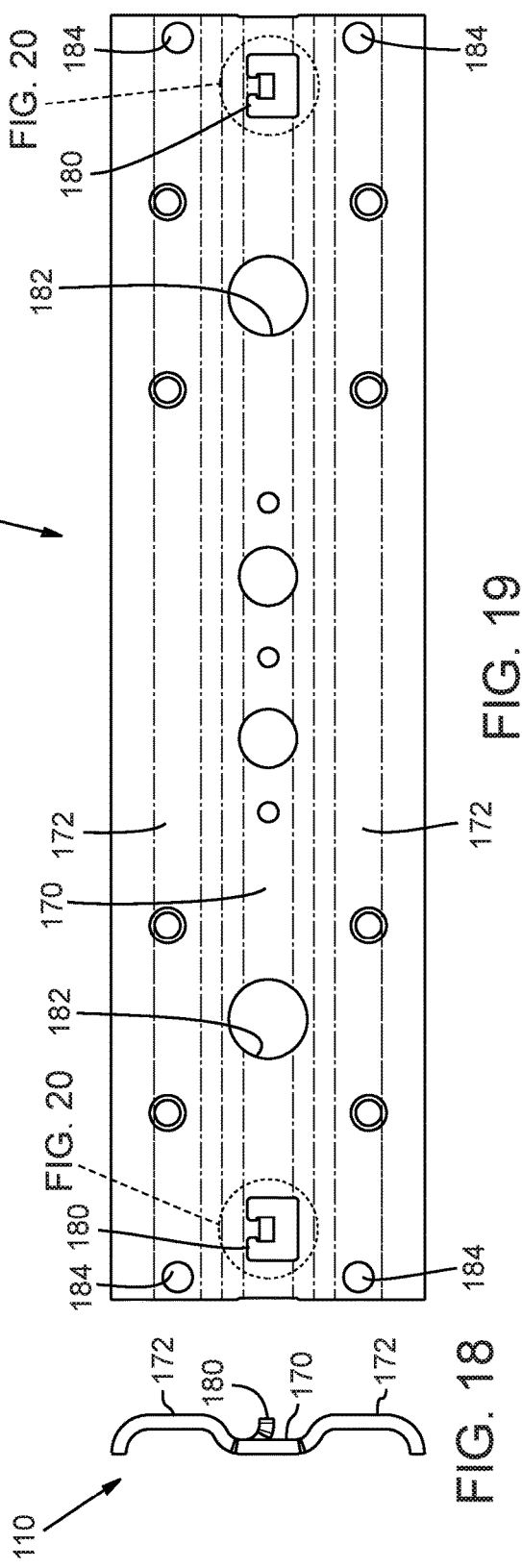

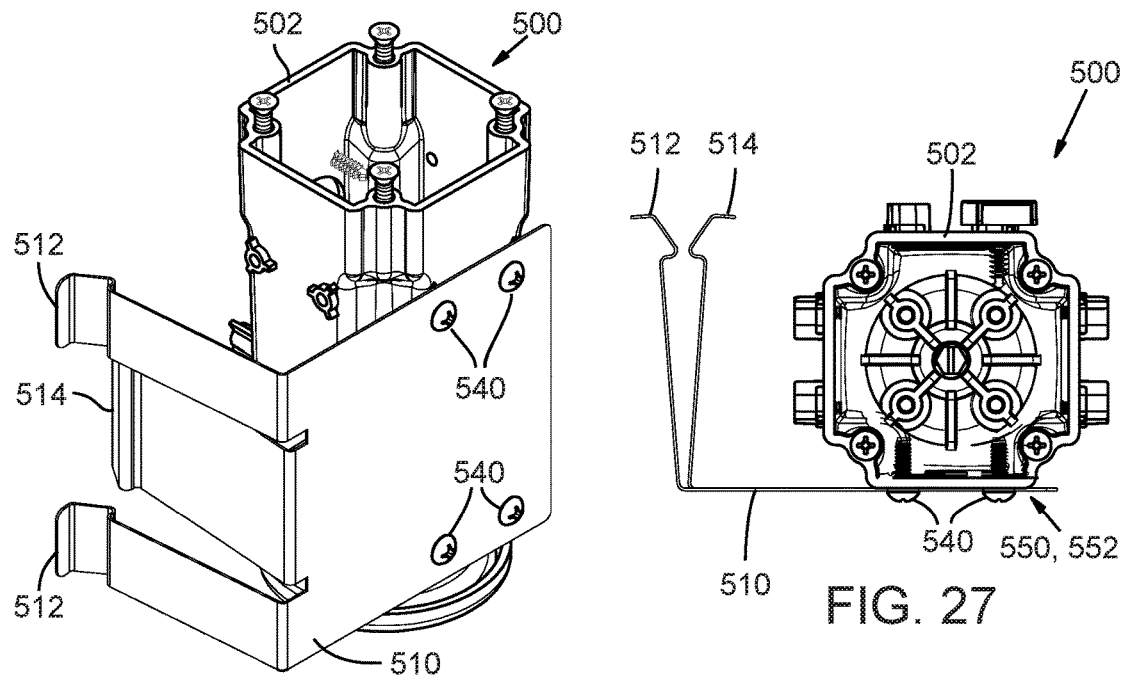
FIG. 26
FIG. 27
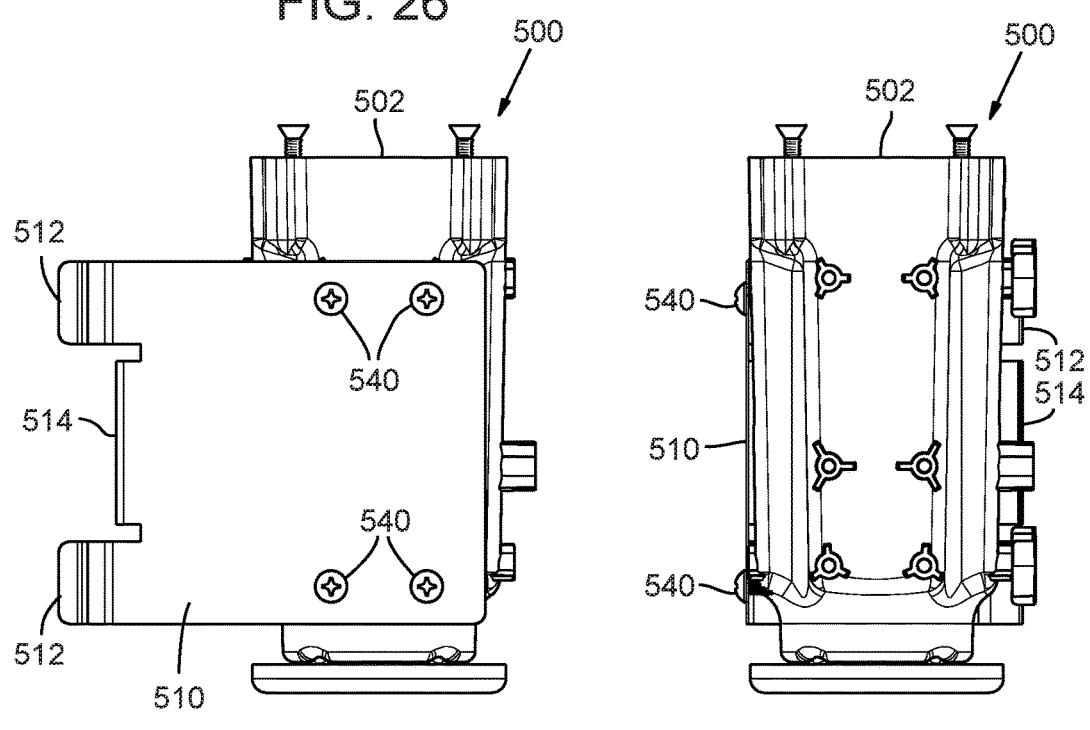
FIG. 28
FIG. 29

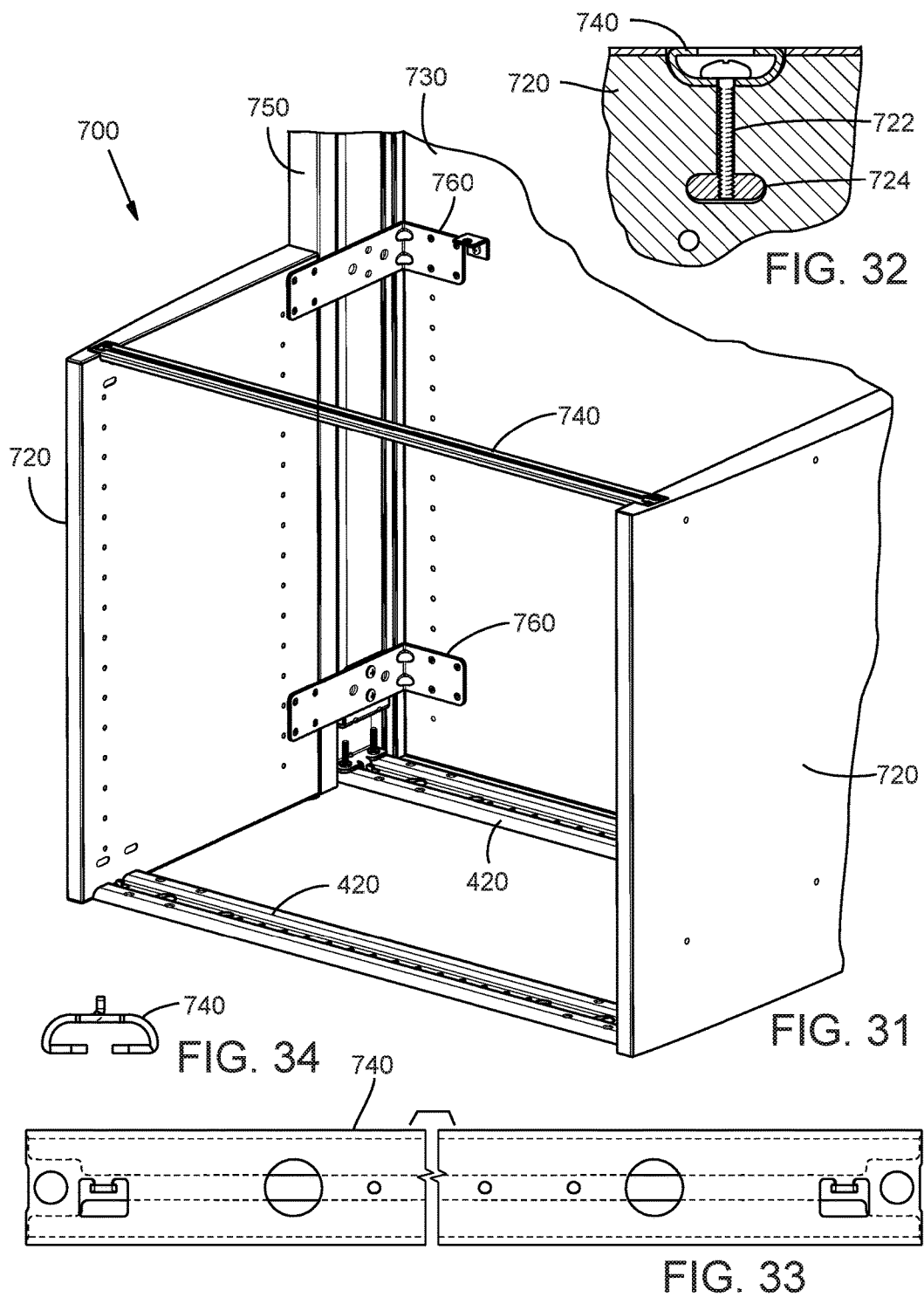

CABINET FOOT AND CABINET FOOT SYSTEM

BACKGROUND

This application relates to furniture, and particularly to feet for cabinets or other structures that are supported above a floor, as well as related components.

Conventional cabinet feet are often inadequate. Such conventional cabinet feet are difficult to adjust in height, and therefore sometimes dictate an inconvenient and/or inefficient order in which multiple cabinets need to be installed. Further, cabinet feet at certain locations may not be within reach for adjustment.

In situations where cabinets cannot be secured to an adjacent wall or other structure, then the cabinet feet alone must adequately prevent the cabinet from moving and/or tipping over, such as during a seismic event. Many conventional cabinet feet provide inadequate support for withstanding a seismic event.

Moreover, especially in cabinets used in dental operatories, medical offices and other similar business and technical settings, the spaces below cabinets are used for routing wires, cables, plumbing and other utilitarian purposes. These spaces may be provided with covers to improve their aesthetic appearance and to prevent debris from accumulating in the spaces, but the spaces must still be accessed, such as for maintenance and repairs.

SUMMARY

Described below are embodiments of a cabinet foot, cabinet foot system and related components that address drawbacks of conventional approaches.

According to one implementation, a foot for a cabinet comprises a body, a leveler and mounting locations. The body has a longitudinal axis, an upper end and a lower end. The leveler is adjustably connected to the lower end of the body, and is adjustable to vary a longitudinal dimension of the foot. The mounting locations are on the body and operable to ferromagnetically couple one or more foundation members in place adjacent the foot. In some implementations, the mounting locations comprise magnet members.

The body can comprise at least one side opening through which a tool can be inserted to access a threaded member for adjusting the position of the leveler. The foot can comprise a top opening through which a tool can be inserted to access a threaded member for adjusting the position of the leveler.

In one implementation, the foot comprises a clip configured for coupling with the foot and for attachment to a supporting surface after the foot is positioned as desired on the supporting surface to resist lateral movement and/or uplift of the foot.

In one implementation, the foot further comprises at least one foundation member. The at least one foundation member can comprise a cover member or a corner member.

In one implementation, the foot comprises a generally rectangular cross-section having four sides, and the magnet members can be coupled to any of the four sides. The foot can comprise studs, and the magnet members can be configured to be coupled to the studs. In another implementation, magnet members are coupled to three sides of the foot.

In one implementation, the magnet members can comprise magnets having openings and magnet covers shaped to fit over the magnets with fastening extensions extending through the central openings, and wherein the foot can comprise protruding studs with bores shaped to receive the fastening extensions.

In one implementation, the foot comprises first projecting studs and second projecting studs. The first projecting studs project away from the foot by a first distance and the second projecting studs project away from the foot by a second distance greater than the first distance. The first projecting studs are positioned on the foot for coupling ends of cover members to the foot. The second projecting studs are positioned on the foot for coupling a corner member to the foot with space for the corner member to overlap installed cover members.

In one implementation, the foot comprises a rail configured to be supported by the foot. The rail can have a cross section with a central trough positioned between raised ribs. The rail can comprise an opening configured for alignment with a top of the foot and through which a tool can be inserted to adjust the leveler.

In one implementation, the foot comprises an anchor configured for attachment at the lower end of the body. The anchor can have a threaded central bore to receive a threaded shaft to which the leveler is attached and an external circular rim. The foot can comprise a clip having a first end configured for coupling to the circular rim of the anchor and a second end configured for being secured to a supporting surface with a bolt or threaded stud.

In one implementation, a foot system for supporting a cabinet comprises at least a first foot and a second foot spaced apart from the first foot, wherein the first foot and the second are height adjustable, a rail attached to an upper end of the first foot and to an upper end of the second foot, the rail having a first foot height adjustment opening aligned with the first foot and a second foot height adjustment opening aligned with the second foot, and at least one foundation member spanning a distance between the first foot and the second foot. The first foot, the second foot and the foundation member can be configured for magnetically coupling the foundation member to the first foot and the second foot.

The foot system can comprise a clip for coupling to at least one of the first foot or the second foot, the clip having one end configured to contact one of the first foot or the second foot, and an opposite end configured to receive a bolt. The at least one of the first foot or the second foot can comprise an anchor with a threaded bore and a leveler threadedly adjustable received in the threaded bore, wherein the anchor comprises an upturned circular rim to which the clip can be coupled.

The foregoing and other features and advantages of the invention will become more apparent from the following detailed description, which proceeds with reference to the accompanying figures.

BRIEF DESCRIPTION OF THE DRAWINGS

FIGS. 9A, 9B, 9C and 9D are perspective, front elevation, side elevation and top plan views, respectively, of a foot system and a portion of a cabinet.

FIGS. 10A and 10B are front elevation and top plan views of a foot.

FIG. 14 is a detailed elevation view of one of the studs of the foot in FIG. 10A.

FIG. 15 is a detailed elevation view of another of the studs of the foot in FIG. 10A.

FIGS. 17, 18 and 19 are perspective, end and top plan views of a rail.

FIG. 20 is a detail view of a projection on the rail.

FIG. 26 is a perspective view of a foot having a bracket, which is shown without any foundation members.

FIGS. 27-29 are top plan, rear elevation and side elevation views of the foot and bracket of FIG. 26.

FIG. 31 is a perspective view of a portion of a cabinet showing lower rails, an upper rail, and a column.

FIG. 32 is a section view in elevation showing the upper rail and a fastener securing it to a cabinet panel.

FIG. 33 is a top plan view of the upper rail of FIG. 31.

FIG. 34 is an end elevation view of the upper rail of FIG. 31.

DETAILED DESCRIPTION

Figure 1:
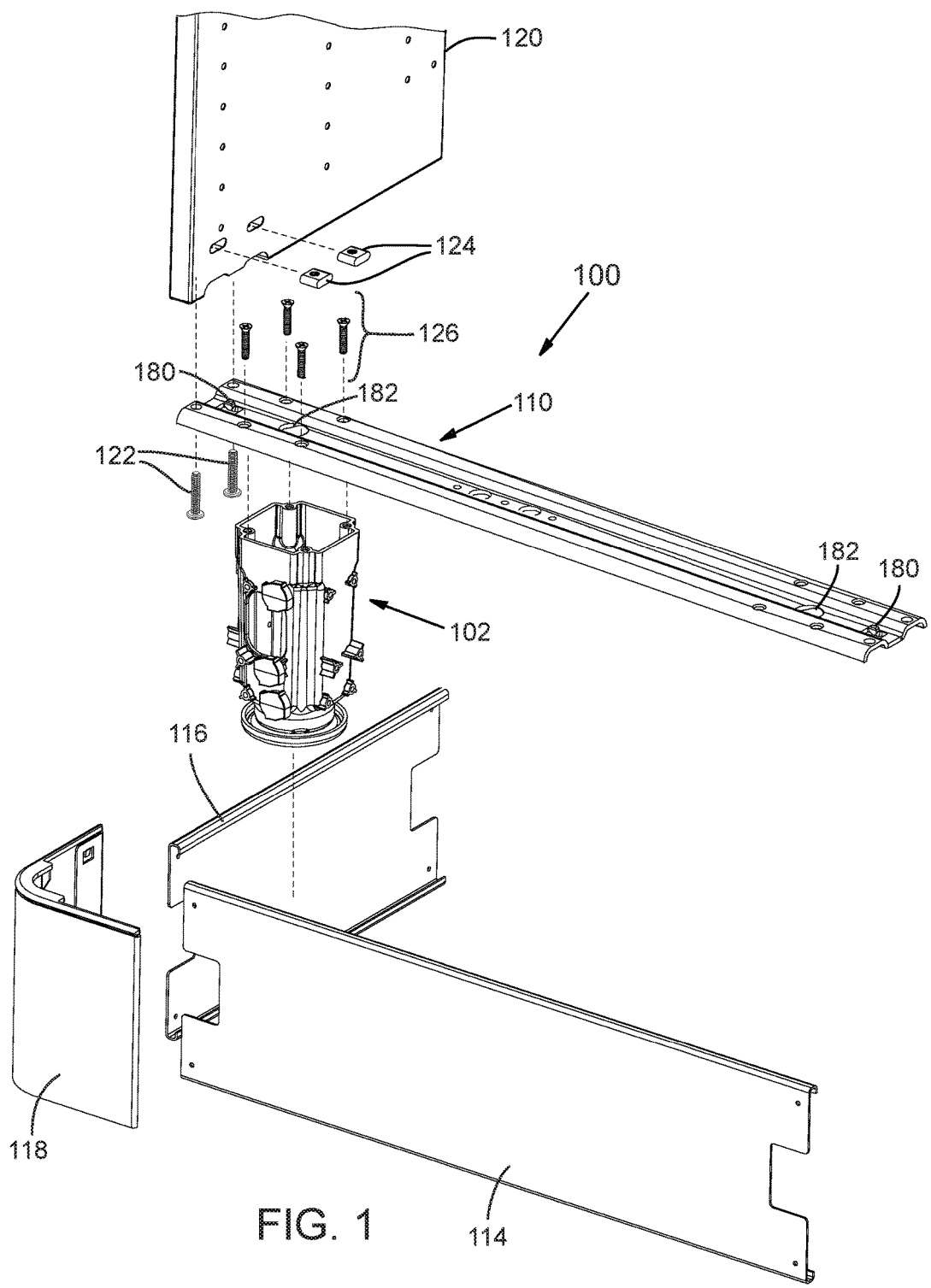
FIG. 1 is an exploded perspective view of a foot system, showing a foot, a rail, a portion of a cabinet supported by the foot and the rail and cover and corner members to cover a space below the cabinet.

FIG. 1 is an exploded perspective view of a foot system 100, such as would be suitable for supporting a cabinet, including cabinets of the type used in a dental operatory. The foot system 100 includes a foot 102 positioned along a rail 110 to support a cabinet, one representative cabinet panel 120 of which is shown in FIG. 1. The foot 102, and the space below the cabinet, can be concealed from view by a first cover member 114, a second cover member 116, and a corner member 118 that covers the ends of the first and second cover members 114, 116 at their intersection.

The rail 110 is typically positioned to extend generally horizontally and is connected to the cabinet. For example, the rail 110 can be connected to the cabinet panel 120 with fasteners 122 and nuts 124. In the illustrated implementation, the nuts 124 are a custom design having rounded ends and an offset threaded hole shaped for insertion into routed slots in the cabinet panel 120 as described below in greater detail.

The foot 102 can be attached to the rail 110, such as at one of multiple pre-defined locations, with fasteners 126.

Figures 2, 21:
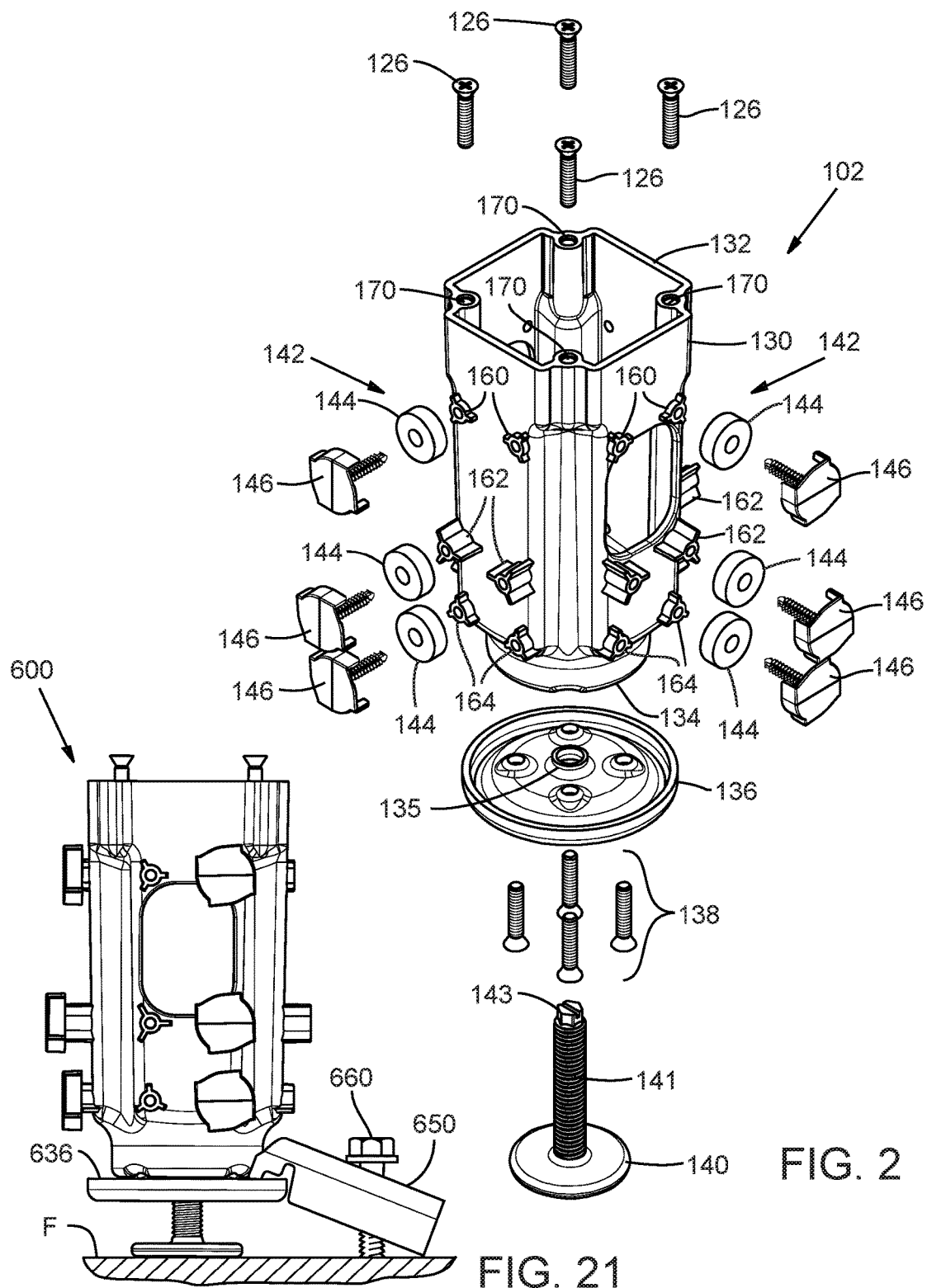
FIG. 2 is an exploded perspective view of a cabinet foot.
FIG. 21 is a side elevation view of the cabinet foot with a leveler partially extended and a clip securing the foot to a floor or other horizontal surface.

FIG. 2 is an exploded perspective view of the foot 102 showing its construction in more detail. The foot 102 has a body 130 with a top 132 at one end and a bottom 134 at an opposite end. The bottom 134 provides a mounting location for another member, also called an anchor 136. The anchor 136 in the illustrated implementation is generally circular and can be attached to the foot 102 with fasteners 138. The anchor 136 has a threaded aperture 135 for receiving a threaded shaft 141 of an adjustable leveler 140 that can be threaded into or out of the foot 102 to change a height of the foot 102 and the structure it supports. In the illustrated implementation, the anchor 136 is provided as a separate member from the body 130 in case it needs to be serviced or replaced. Also, the circular shape and upturned rim of the anchor 136 provides up to 360 degrees of adjustability (in the absence of interfering structure) in attaching a separate clip (FIG. 21) to the anchor, as discussed below.

Conveniently, the threaded shaft 141 can have an end 143 that is shaped to receive a tool such that the shaft 141 can be rotated to adjust its position while installed, either from the top or the side, as is explained below in greater detail. The adjustable leveler 140 can have a bottom surface that is formed of or coated with a material that makes the leveler 140 easy to slide over typical finished and unfinished surfaces.

As shown in the illustrated implementation, the body 130 can have at least two mounting surfaces that are orthogonal to each other. In a specific implementation, the body 130 has four such mounting surfaces and thus has a square or rectangular cross-section in that region. The mounting surfaces can have one or more mounting locations. In the illustrated implementation, there are mounting locations 142 that are formed as protrusions or studs. Selected ones of the mounting locations can be used in a specific installation, such as by coupling magnet members 144 at the selected mounting locations. The magnet members 144 in the illustrated implementation are generally cylindrical and have a central bore shaped to fit on or over the studs (exemplary studs 160, 162 and 164 are described below in greater detail). The magnet members 144 can be coupled with magnet covers 146 that are insertible into bores of the studs, such as by using press-in plastic fasteners having threaded extensions.

Figure 3:
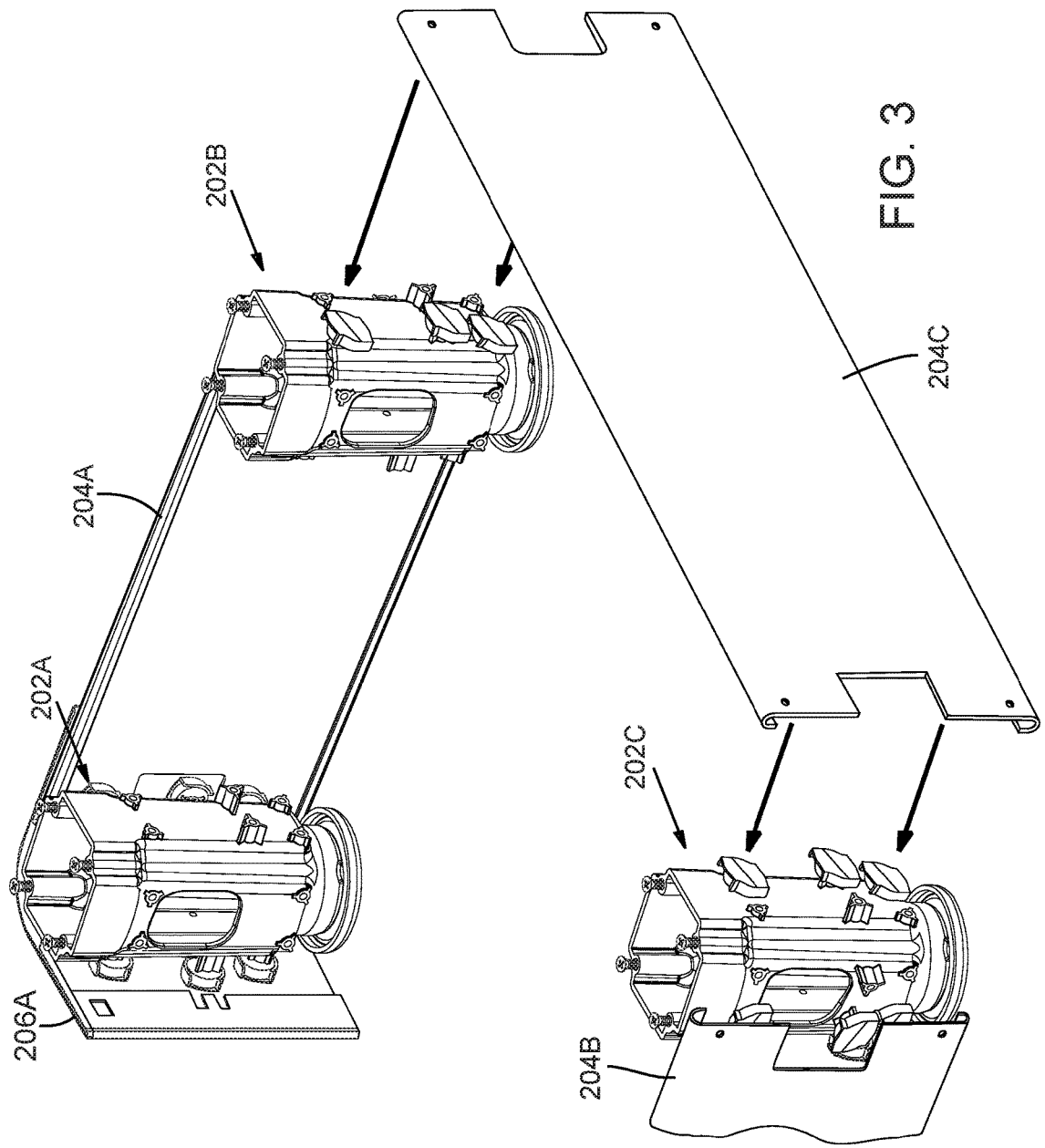
FIGS. 3-6 are a series of perspective views of a cabinet foot system having several feet and cover member at different stages during assembly.

FIGS. 3-6 are perspective views showing multiple feet and some of the steps involved in coupling cover members and corner members to the feet to form a finished assembly. The feet 202A, 202B, 202C are spaced apart to support a structure, such as a cabinet, which has been omitted for the sake of illustration. In FIG. 3, a first cover member 204A is shown coupled at one end to a foot 202A and at an opposite end to a foot 202B. A portion of a second cover member 204B is shown coupled to a foot 202C. A corner member 206A is also shown installed over the cover member 204A and extending around the foot 202A. As shown by the arrows, a third cover member 204C is being positioned to span the distance separating the foot 202B and the foot 202C. Cover members and corner members are also referred to as "foundation" or "foundation members."

Figure 4:
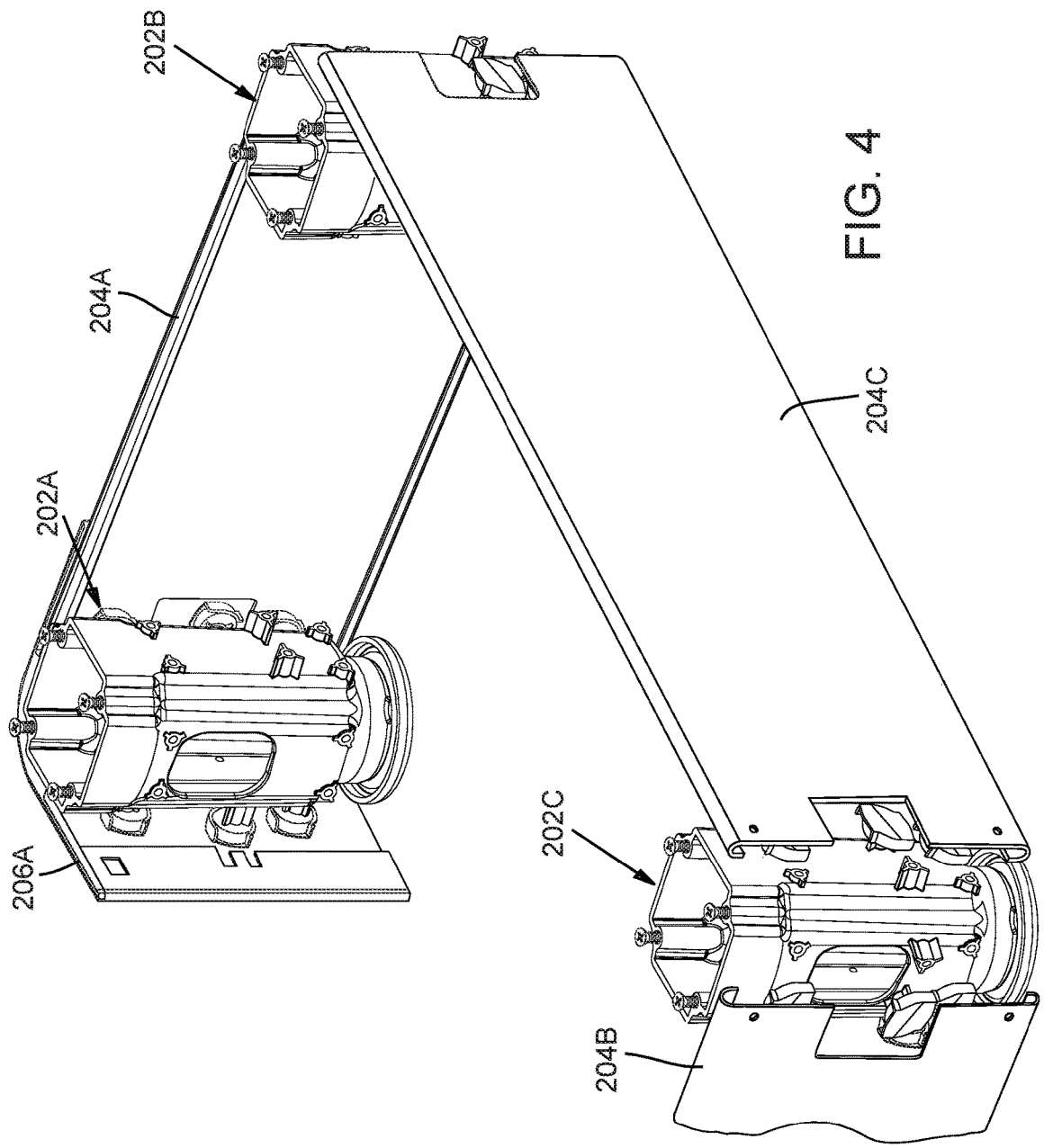

As shown in FIG. 4, the third cover member 204C can be aligned with the selected mounting locations and coupled to complete its assembly without tools, such as by positioning the cover member 204C in contact with magnet members on the foot 202B and the foot 202C at the selected mounting locations, respectively.

Figure 5:
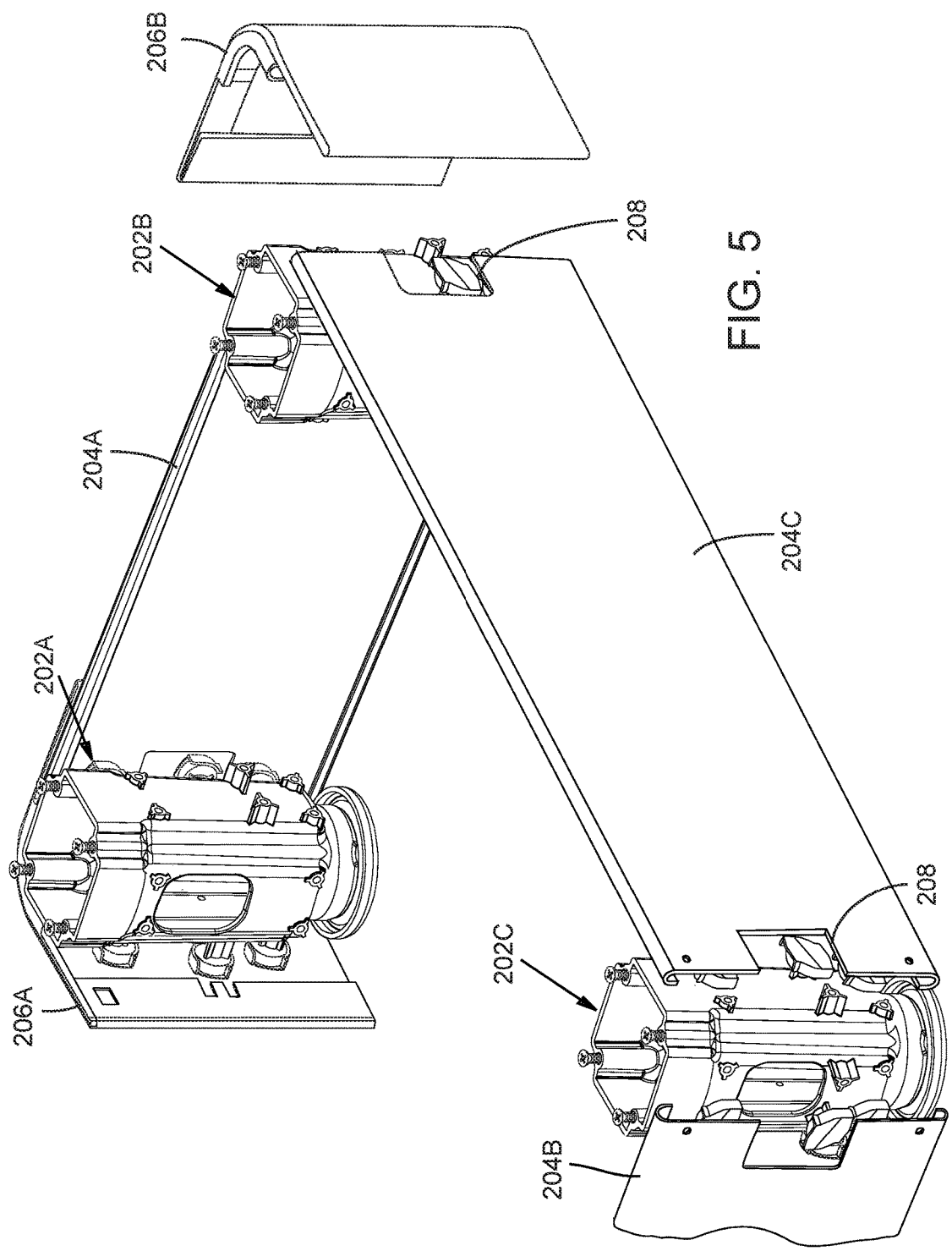
Figure 6:
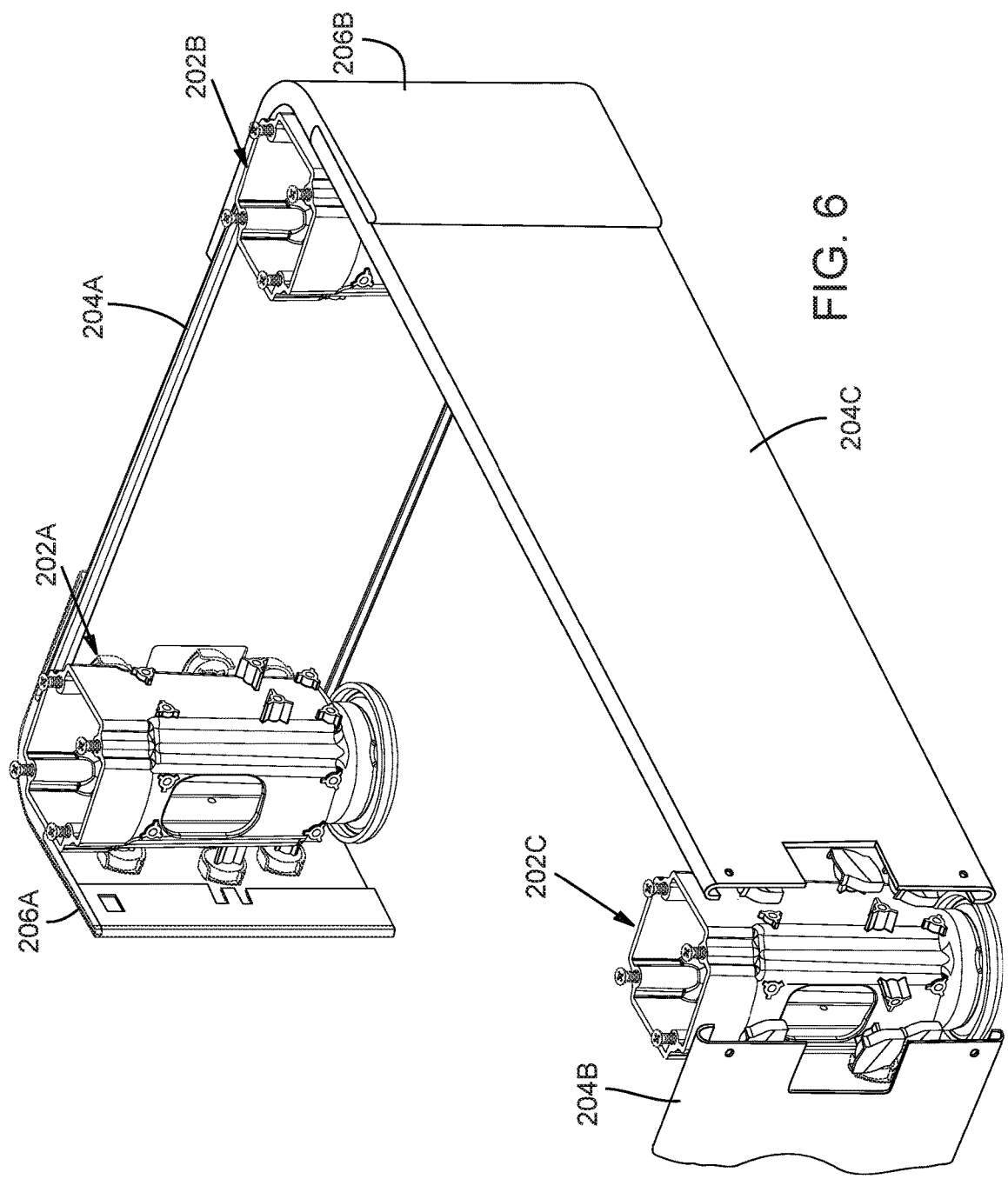

As shown in FIG. 5, a second corner member 206B can be aligned as shown for mounting. In the illustrated implementation, selected mounting locations are exposed by the cutout 208 in each end of the installed cover member 204C. FIG. 6 shows the second corner member 206B coupled to cover ends of the cover members 204A and 204C, respectively, and to extend around the foot 202B.

In the illustrated implementation, the foundation members are fabricated of a magnetic material such that can be magnetically coupled to the magnet members on the foot. It would also be possible, however, to have the foundation members be generally non-magnetic but to have attached magnets or attached ferromagnetic material (not shown) at selected locations. It would also be possible to use other forms of attachment, e.g., hook and loop fasteners, to secure the foundation members to each foot as desired but still allow tool-free and quick removal of the foundation members.

Figure 7:
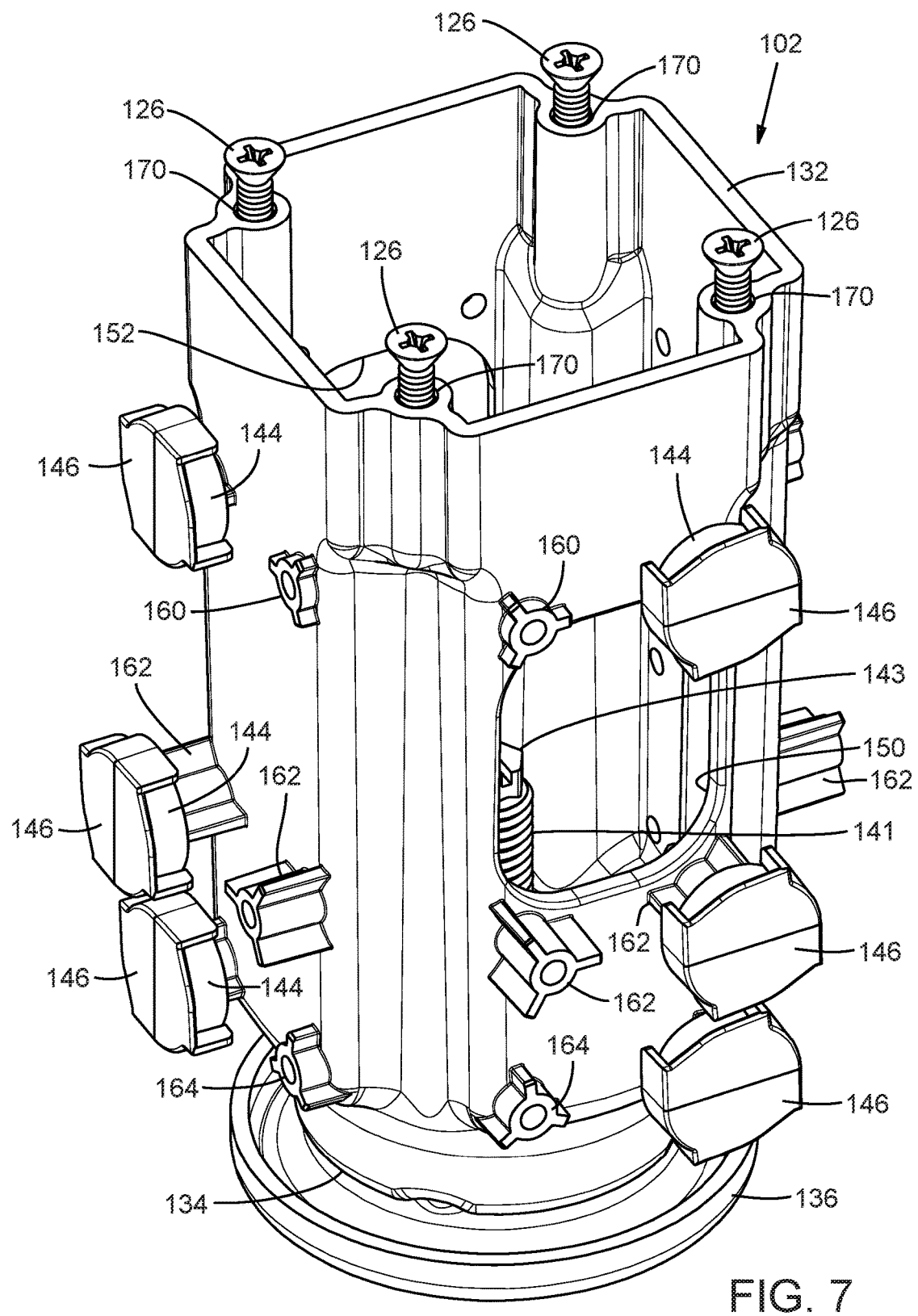
FIG. 7 is an enlarged perspective view of a foot.

FIG. 7 is an enlarged perspective view of the foot 102 of FIG. 2 as assembled together and oriented to show an access opening 150. The access opening 150 can be used to access the end 143 of the threaded shaft 141. For example, a wrench or offset screwdriver can be inserted through the access opening 150 and coupled to the end 143 to allow the shaft to be rotated and thus change the height of the foot 102. In the illustrated implementation, there is also a second access opening 152 on an opposite side of the foot 102.

Figure 8:
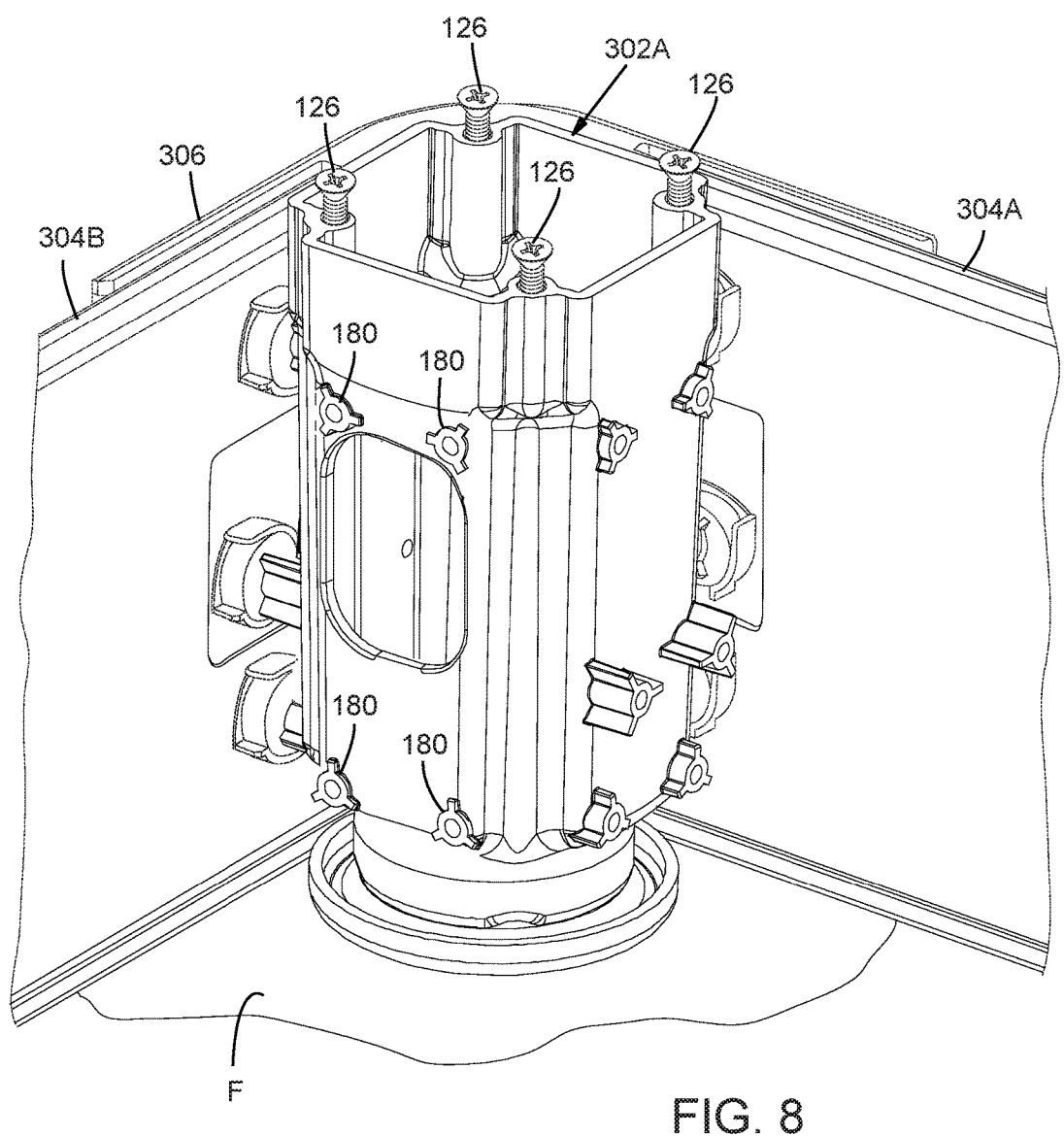
FIG. 8 is a perspective view of a foot together with portions of cover members coupled to the foot.

FIG. 8 is an enlarged perspective view of a foot 302A to which first and second cover members 304A and 304B and a corner member 306 have been coupled. As shown, the cover members 304A, 304B and corner member 306 are adjustably positioned relative to the foot 302A at least in a vertical direction. In FIG. 8, the cover members 304A, 304B and corner member 306 are positioned in contact with a floor F or other supporting surface. It would be possible in other implementations to have the cover members and corner member spaced above the floor by a selected gap. Further, in installations where the supporting surface is not level, it is possible to mount the cover members at a slight angle to help conceal a non-uniform gap.

In some installations, the foundation members are adapted to work with one or more pedals located within the vertical space defined by the feet. The pedals are typically positioned to project proud of the cabinet so a user can see and use them. The various connections to the pedals, such as control and/or water lines, can be accommodated within the vertical space. The described foundation members that are magnetically coupled to the feet simplify the process of retrofitting and/or maintaining pedals and other such equipment.

FIGS. 9A-9D are perspective, front elevation, side elevation and top plan views, respectively, of an assembly 400 showing a foot 402 (FIG. 9C) attached to a rail 410 with first and second cover members 404A and 404B and a corner member 406 coupled to the foot 402. In addition, FIGS. 9A-9D show a cabinet panel 420 connected to the rail 410. In the illustrated implementation, the foot 402 is positioned interiorly of the cover members and the corner member. Further, the cover members 404A, 404B and the corner member 406 are positioned interiorly of at least the cabinet panel 420.

Figure 9E:
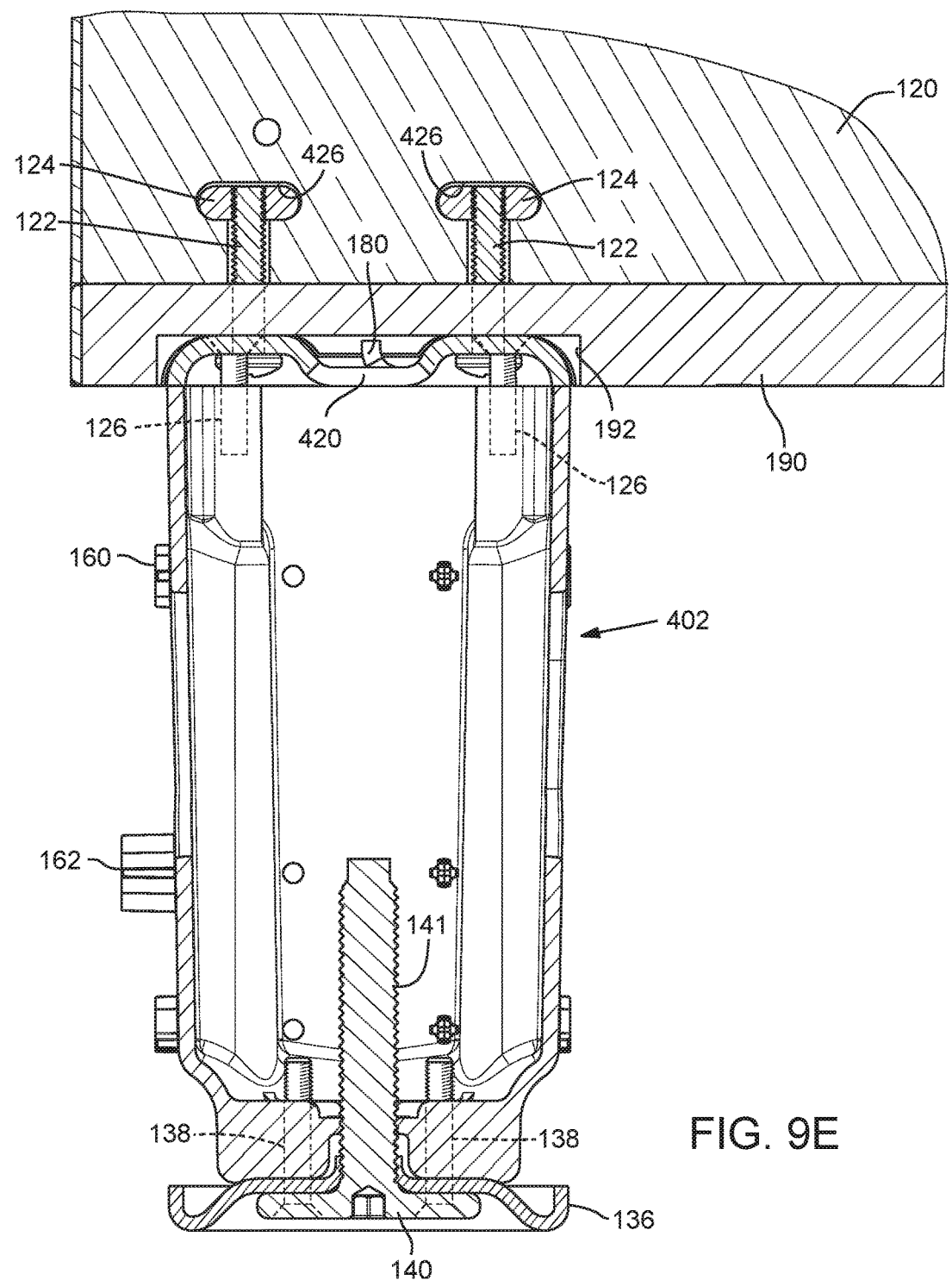
FIG. 9E is a magnified section view in elevation of the foot, rail, fasteners and cabinet panel of FIG. 9C.

FIG. 9E is a section view in elevation of the foot 402 as coupled to the rail 410 and a portion of the cabinet panel 120 similar to FIG. 9C, but shown at a magnified scale and without the foundation members. The rail 410 is secured to the foot 402 by the four fasteners 126 (two of which are visible in FIG. 9E). The panel 120 is secured to the rail 410 by the fasteners 122, which extend through openings in the rail 410 and bores in the panel 120 and are received in the nuts 124. The nuts 124 are housed in slots or openings 426 that are shaped to receive the nuts 124 and prevent them from rotating.

The fastening arrangement for coupling upright panels to horizontal members (such as the rails) achieves a highly secure connection between these components without (1) requiring added structure on the exterior of the cabinet or (2) requiring added structure in the interior of the cabinet. Conventional approaches requiring additional structure on the exterior of the cabinet lead to an unfinished appearance and inconvenient and potentially unsafe protrusions. Efforts to cover such protruding structure with another panel or other cover structure require additional material, cost and installation time. Conventional approaches that use structure protruding into the interior of the cabinet make cleaning the cabinet more difficult and consume valuable interior space, among other disadvantages.

FIGS. 10A and 10B are front elevation and top plan views, respectively, of the foot 102. In one implementation, the foot 102 includes mounting locations (similar to the mounting locations 142 shown in FIG. 2), such as for magnets, on three sides, and a fourth side does not include any such mounting locations. In some embodiments, the mounting locations include projecting studs, such as upper studs 160, intermediate studs 162 and lower studs 164, as described below in further detail. In some embodiments, the fourth side of the foot can include attachment features, such as for brackets, as is discussed below in greater detail.

As seen in FIG. 10A, the upper studs 160 and the lower studs 164 are intended for use in coupling the cover members to the foot 102. The intermediate studs are intended for use in coupling the corner member to the foot 102. Specifically, the intermediate studs 162 are positioned to remain accessible through the cutouts in the cover members after the cover members are installed. In this way, the corner member can be coupled to the foot by positioning it to contact the exposed magnet members on the intermediate studs 162. In the illustrated implementation, the intermediate studs 162 protrude farther than the upper studs 160 and the lower studs 164.

Figure 11:
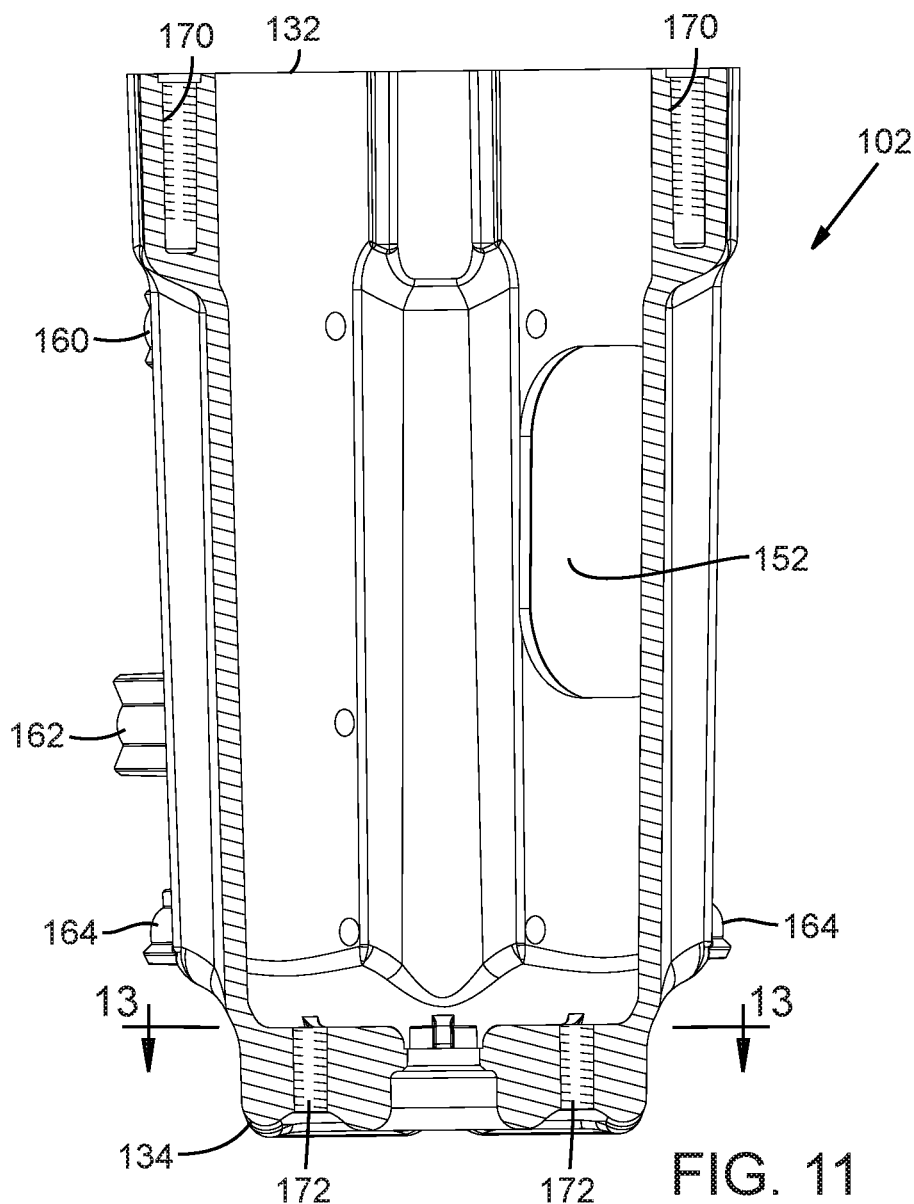
FIG. 11 is a section view in elevation taken along the line 11-11 in FIG. 10B.

FIG. 11 is a section view of the foot 102 in elevation taken at the line 11-11 in FIG. 10B. As shown in FIG. 11, there are bores 170 at the top 132 for receiving the fasteners 126. In a specific implementation, there are four bores 170. There are bores 172 at the bottom 134 for receiving the fasteners 138 that secure the anchor 136 to the bottom 134. The bores may be threaded to receive threaded fasteners. In addition, any of the bores (or apertures) may have an anti-rotation feature similar to a Nyloc nut by which the fastener rotates only if sufficient torque is applied. The aperture 135 for the leveler 140, or the bottom of the foot 102 to which the anchor 136 is attached, can be configured with the anti-rotation feature, which has the benefit of making it easier to use a ratchet wrench on the end 143 of the shaft 141 because the leveler 140 will resist rotation unless sufficient torque is applied.

Figure 12:
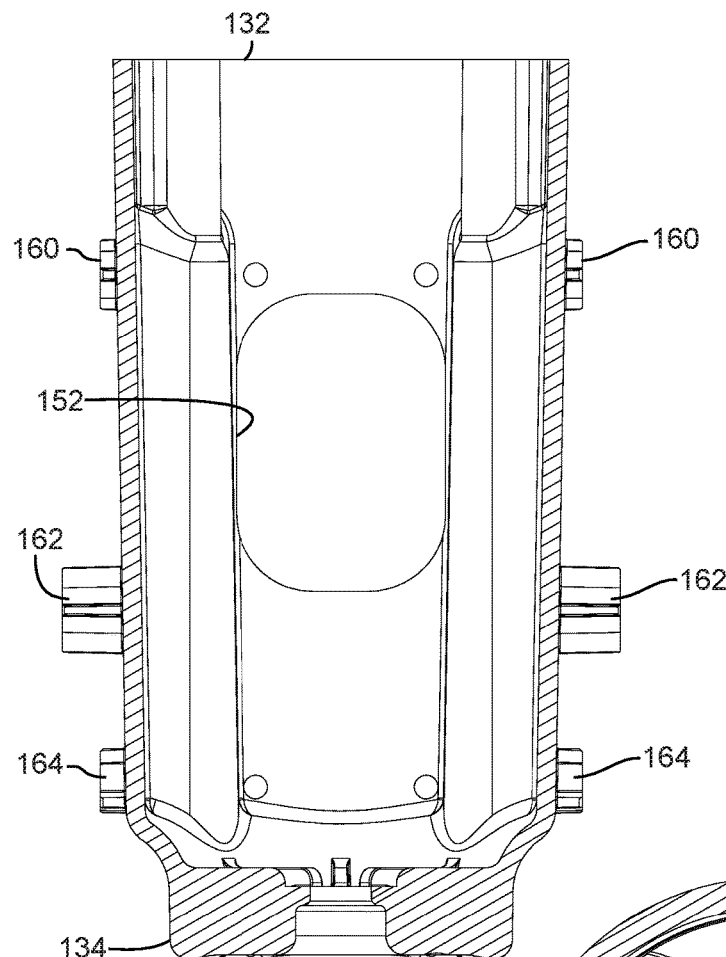
FIG. 12 is another section view in elevation taken along the line 12-12 in FIG. 10B.

FIG. 12 is a second section view of the foot 102 in elevation taken at the line 12-12 in FIG. 10B. As shown in FIG. 12, the bottom 134 has a substantial thickness.

The foot system has a robust design that meets seismic requirements, such as those described Chapter C13 of ASCE/SEI 7-10 "Minimum Design Loads for Buildings and Other Structures" and the International Building Code (IBC) (2012 edition). The foot system is configured to withstand a cabinet tipping over, even when the cabinet is subjected to relatively large lean angles. The foot has a large cross-section compared to conventional feet. The body of the foot may be made of a suitably strong thermoplastic material. The rails are preferably made of steel. Because the rails are steel, they are smaller in size and generally lighter than corresponding wood members providing equal strength. Overall, the design is sturdy, and the foot is not easily broken. If necessary, however, the foot may in many cases be replaced while the cabinet remains installed because the foot is coupled to the rail by fasteners. In addition, the steel and thermoplastic materials used in the rails and feet are more resistant to moisture than counterpart wooden components.

Figure 13:
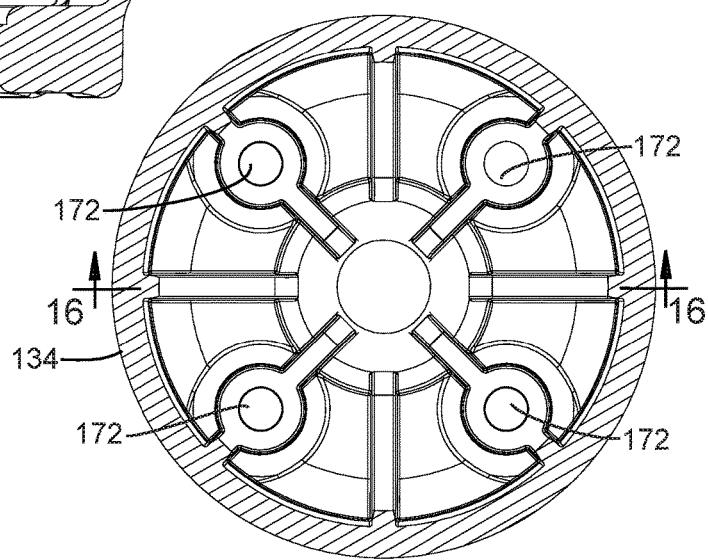
FIG. 13 is a section view in plan taken along the line 13-13 in FIG. 10A.

FIG. 13 is a section view in plan of the foot 102 showing the bottom 134. The bore holes 172 can be seen in FIG. 13.

FIG. 14 is a detailed view in elevation showing one of the upper studs 160. The lower studs 164 have substantially the same configuration. FIG. 15 is a detailed view in elevation showing one of the intermediate studs 162.

Figure 16:
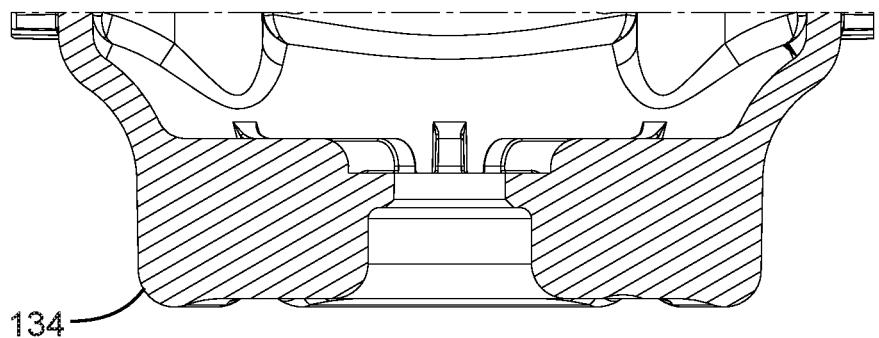
FIG. 16 is a section view in elevation taken at line 16-16 in FIG. 13.

FIG. 16 is a section view in elevation of a bottom portion of the foot 102.

FIG. 17-19 are perspective, top plan and end elevation views, respectively, of the rail 110. FIG. 20 is a detailed view of the projection 180.

As shown in the illustrated implementation, the rail 110 can have a center trough 170 in its upper surface extending in the longitudinal direction between two raised ribs 172. Thus, the cross-section of the rail as seen in FIG. 18 can be described as a two-ridge or two-bump cross-section.

The rail 110 has large openings 182 along its length that are positioned to provide access to a foot positioned underneath, such as for inserting a tool to adjust the leveler (see also FIG. 35 and the corresponding description below). There are openings 184 for the fasteners 122 used to connect cabinet panel components to the rail 110. The projections 180 are designed to abut against the cabinet panel 120 when it is properly aligned with the openings 184 for the fasteners 122.

FIG. 21 is a side elevation view of a foot 600 that is held in place relative to the floor F by a clip 650. The clip 650 has one end shaped to contact the foot, such as with the anchor 636 as shown, and another end shaped for securing the clip to the floor, such as with a bolt or anchor 660. A stud or other fastening arrangement could also be used. The clip 650 is preferably dimensioned so as to provide sufficient reach between the foot 600 and the floor F even if the leveler is fully extended.

FIGS. 22-25 show an assembly 500 of a foot 502 having a bracket 510 used to hold one or more foundation members in place. In the implementation illustrated in FIGS. 22-25, the bracket 510 is shown securing two foundation members in place, e.g., a first foundation member 522 and a second foundation member 526. FIGS. 26-29 show the foot and bracket without the foundation members.

The bracket 510 is attached to the foot 502, such as with fasteners 540. In some implementations, the fasteners 540 are self-tapping screws that can be driven into predefined attachment locations (e.g., attachment locations 180 as shown, e.g., in FIG. 8).

Figure 22:
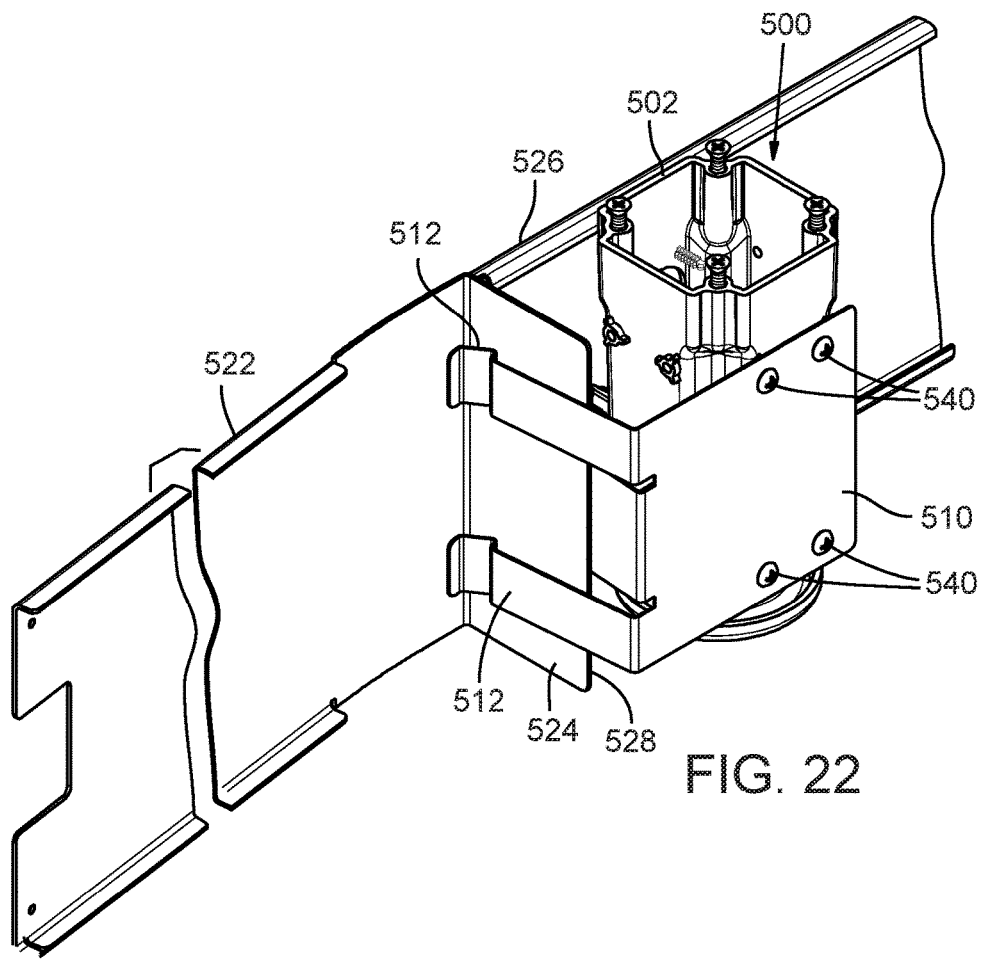
FIG. 22 is a perspective view of a foot having a bracket for positioning foundation members.
Figure 23:
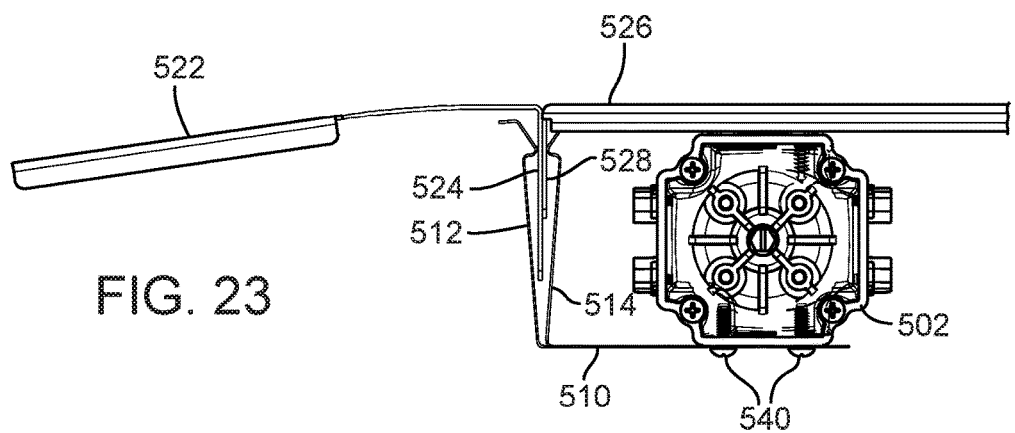
FIGS. 23-25 are top plan, rear elevation and side elevation views of the foot, bracket and foundation members of FIG. 22.
Figure 24:
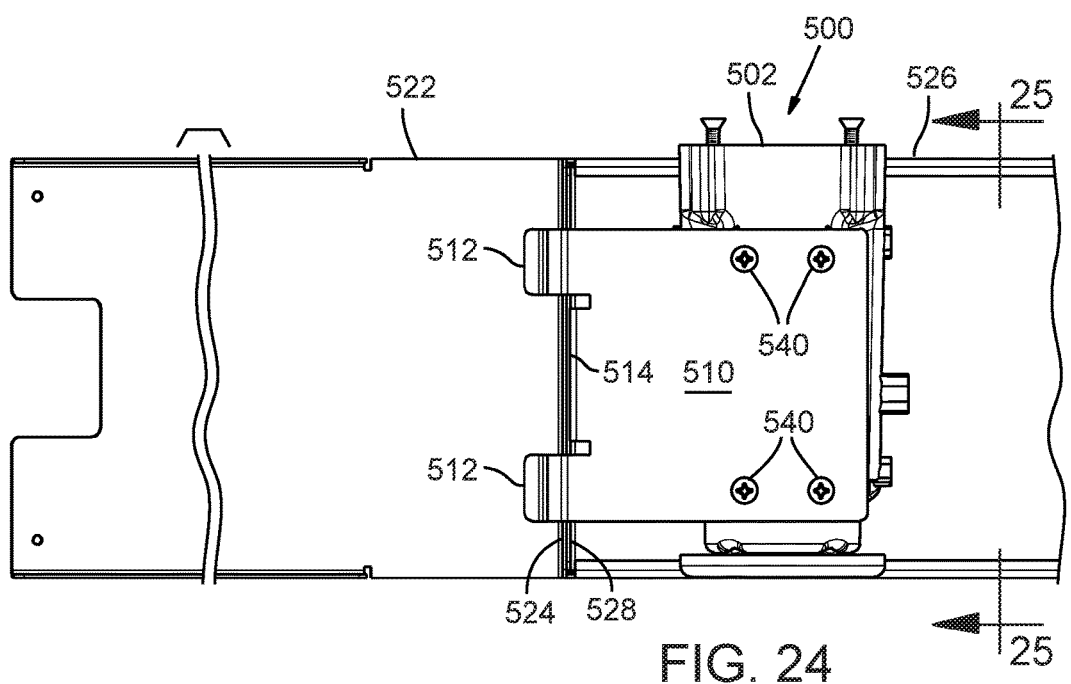
Figure 25:
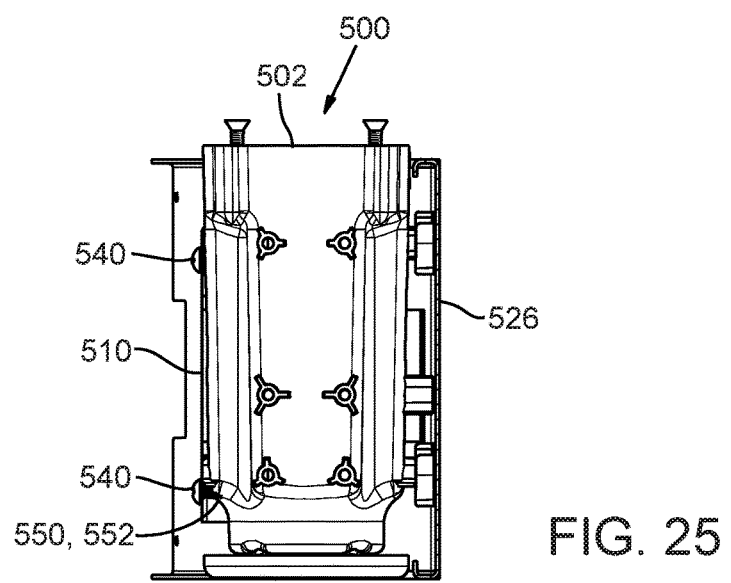

The bracket 510 is configured with retaining members, such as the first retaining members 512 and an opposing retaining member 514. The retaining members 512, 514 are configured to be resilient and to exert a retaining force. As best shown in FIGS. 22 and 23, a tab 524 of the first foundation member 522 and a tab 528 of the second foundation member 526 are being retained between the two first retaining members 512 contacting the tab 524 and the second retaining member 514 contacting the tab 528. The retaining force can be predetermined as desired to provide the required retention for one or more tabs, as well as to allow easy insertion and removal in case adjustments are needed. The assembly 500 provides for assembling multiple foundation members together end-to-end in with a smooth and finished appearance.

Figure 30:
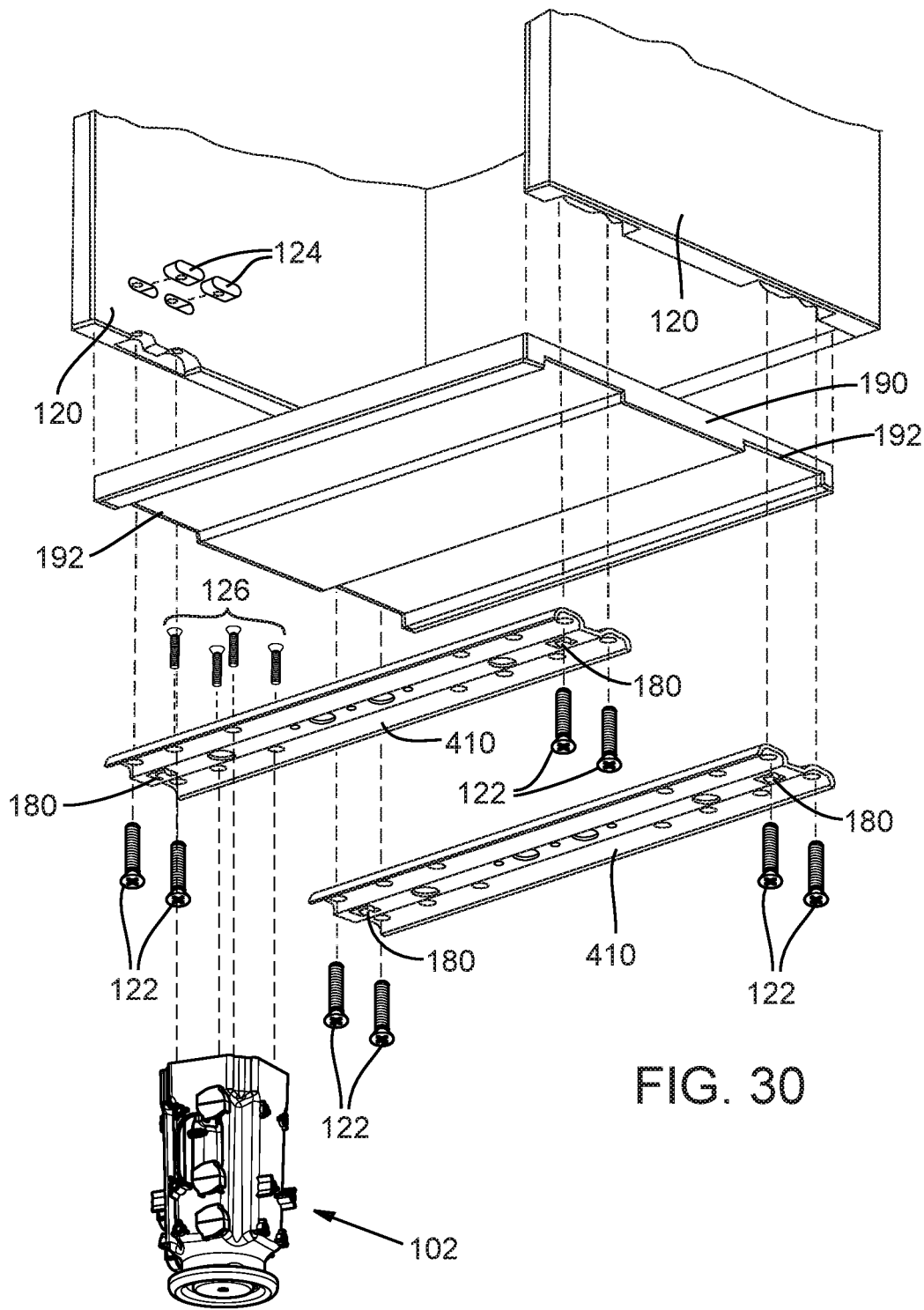
FIG. 30 is an exploded perspective view of a cabinet having a removable lateral panel.

FIG. 30 is an exploded perspective view of an assembly having an optional removable lateral member 190. The removable lateral member 190 can be configured as a cabinet bottom as shown, or it may be configured for use in other locations, such as at a top of a cabinet. The removable lateral member 190 is supported by one or more of the rails 410, such as the two rails 410 as shown. The removable lateral member 190 can be configured to have grooves or channels 192 to receive the rails 410. Because the rails 410 are securely connected to the panels 120, and because the removable lateral member 190 fits between the panels without excess play, the removable lateral member 190 once installed (see FIG. 9E) provides a secure base to support the contents of the cabinet. Because the removable lateral member 190 is removable without tools simply by lifting it off of the rails 410, it provides easy access to the space beneath the cabinet, such as to access the foot 102 or any utilities that may occupy that space. In some implementations, the removable lateral panel is free floating. In addition, the removable lateral member can be removed while the cabinet is used for certain functions, including, e.g., if the cabinet is configured to house a dryer that would benefit from the additional airflow provided when the cabinet bottom is removed.

FIG. 31 is a perspective view of an assembly 700 in which additional details of a cabinet are shown. The assembly 700 includes a pair of the rails 420 supporting vertical cabinet panels 720. Additionally, there is an upper rail 740 that connects upper edges of the cabinet panels 720. The upper rail 740 has a smaller cross section than the rails 420, but is also configured to have a contoured cross-section providing sufficient strength with radiussed edges to prevent injury to users and damage to contents stored in the cabinet.

FIG. 34 shows a cross section of the upper rail 740. FIG. 33 shows a top plan view of the upper rail 740. FIG. 32 is a section view in elevation showing the upper rail 740 secured to a panel using a fastener 722 and nut 724 (which can be configured similar to the fasteners 122 and nuts 124).

As also shown in FIG. 31, the cabinet can be provided with a column cover 750 between the left panel 720 and a back 730. The column cover 750 can be secured to the adjacent panel 720 and the back 730 with brackets 760.

Figure 35:
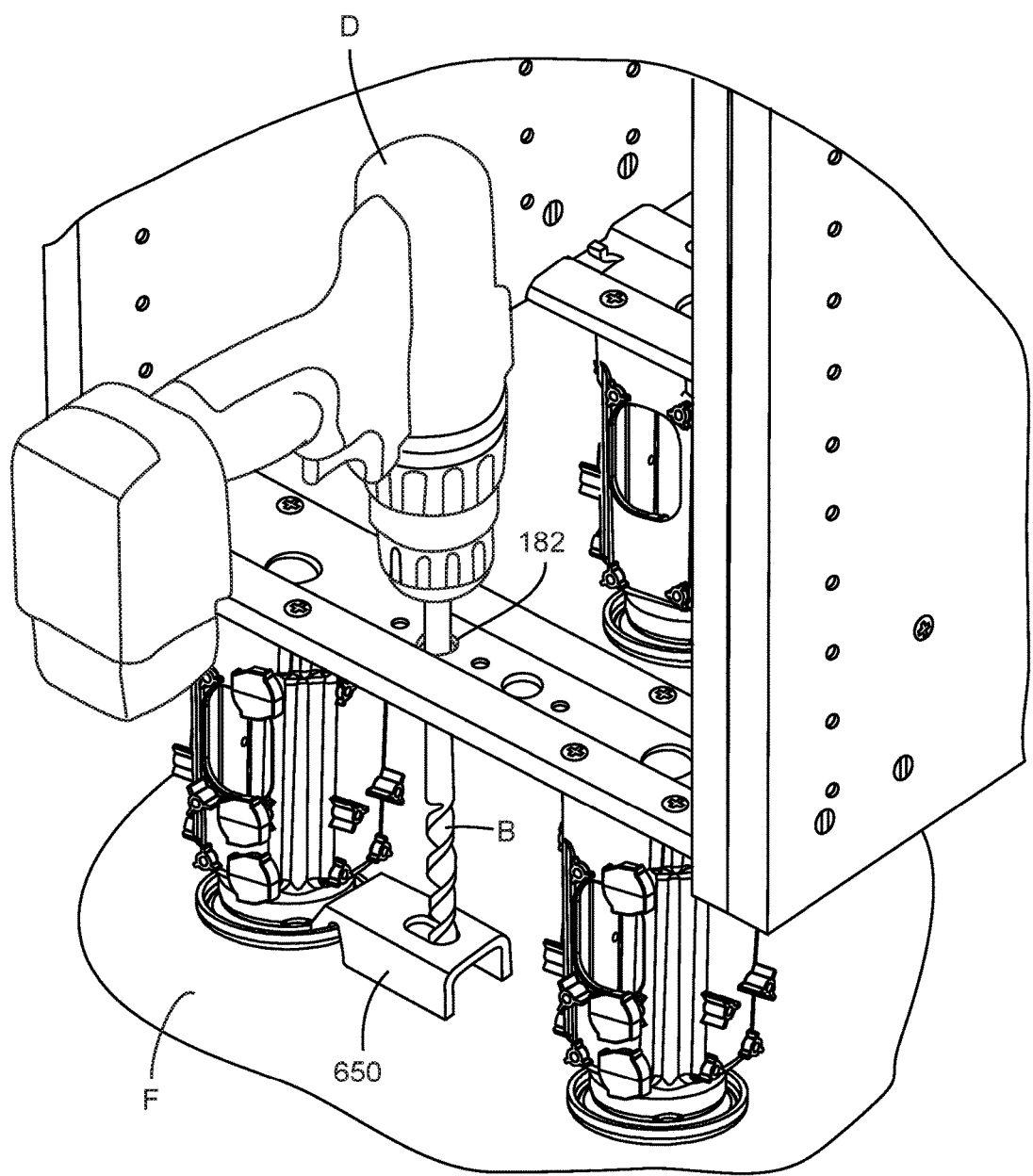
FIG. 35 is a perspective view of a portion of a cabinet showing the lower rail being used as a drill guide during installation of a clip for the foot.

FIG. 35 is a perspective view of an assembly showing one of the openings 182 in the rail 420 being used as a guide for a bit B in a drill D for drilling a hole in the floor F to secure the clip 650. Thus, in addition to the easily removable foundation members, the removable lateral member and a foot construction allowing replacement without disassembling the cabinet, the assembly also is designed to ensure convenient and accurate installation that meets seismic requirements.

In view of the many possible embodiments to which the disclosed principles may be applied, it should be recognized that the illustrated embodiments are only preferred examples and should not be taken as limiting in scope. Rather, the scope of protection is defined by the following claims. We therefore claim all that comes within the scope and spirit of these claims.

We claim:

1. A foot for a cabinet, comprising:
   a body having a longitudinal axis, an upper end and a lower end, the upper end having attachment locations for a rail that extends laterally to at least one adjacent foot, wherein the body is configured to support at least a portion of the rail and a portion of the cabinet positioned on the rail;
   a leveler adjustably connected to the lower end of the body, the leveler being adjustable to vary a longitudinal dimension of the foot; and
   mounting locations on the foot for ferromagnetically coupling one or more foundation members in place adjacent the foot, the mounting locations comprising magnet members positioned to support the one or more foundation members in an upright orientation generally parallel to the longitudinal axis.

2. The foot for a cabinet of claim 1, wherein the mounting locations are positioned on at least two sides of the foot.

3. The foot for a cabinet of claim 1, wherein the body comprises at least one side opening through which a tool can be inserted to access a threaded member for adjusting the position of the leveler.

4. The foot for a cabinet of claim 1, wherein the foot comprises a top opening through which a tool can be inserted to access a threaded member for adjusting the position of the leveler.

5. The foot for a cabinet of claim 1, further comprising a clip configured for coupling with the foot and for attachment to a supporting surface after the foot is positioned as desired on the supporting surface to resist at least one of lateral movement and uplift.

6. The foot for a cabinet of claim 1, further comprising at least one foundation member.

7. The foot for a cabinet of claim 6, wherein the at least one foundation member comprises a cover member.

8. The foot for a cabinet of claim 6, wherein the at least one foundation member comprises a corner member.

9. The foot for a cabinet of claim 1, wherein the foot comprises a generally rectangular cross-section having four sides, and wherein the mounting locations are positioned on the four sides.

10. The foot for a cabinet of claim 9, wherein the foot comprises studs in the mounting locations, and wherein the magnet members are configured to be coupled to the studs.

11. The foot for a cabinet of claim 1, wherein the magnet members comprise magnets having openings and magnet covers shaped to fit over the magnets with fastening extensions extending through the openings, and wherein the foot comprises protruding studs with bores shaped to receive the fastening extensions.

12. The foot for a cabinet of claim 1, wherein the foot comprises first projecting studs and second projecting studs, the first projecting studs projecting away from the foot by a first distance and the second projecting studs projecting away from the foot by a second distance greater than the first distance, and wherein the first projecting studs are positioned on the foot for coupling ends of cover members to the foot, and wherein the second projecting studs are positioned on the foot for coupling a corner member to the foot with space for the corner member to overlap installed cover members.

13. The foot for a cabinet of claim 1, further comprising a rail connected to the attachment locations of the foot.

14. The foot for a cabinet of claim 13, wherein the rail has a cross section with a central trough positioned between raised ribs.

15. The foot for a cabinet of claim 13, wherein the rail comprises an opening configured for alignment with a top of the foot and through which a tool can be inserted to adjust the leveler.

16. The foot for a cabinet of claim 1, farther comprising an anchor configured for attachment at the lower end of the body, the anchor having a threaded central bore to receive a threaded shaft to which the leveler is attached and an external circular rim.

17. The foot for a cabinet of claim 1, further comprising a clip having a first end configured for coupling to the circular rim of an anchor and a second end configured for being secured to a supporting surface with a bolt or threaded stud.

18. The foot of claim 1, wherein the leveler is configured to require a predetermined minimum torque to overcome resistance to rotation, thereby facilitating use of a socket wrench on the upper end in adjusting the leveler.

19. A foot system for supporting a cabinet, comprising:
   at least a first foot and a second foot spaced apart from the first foot, wherein the first foot and the second foot are height adjustable;
   a rail attached to an upper end of the first foot and to an upper end of the second foot, the rail having a first foot height adjustment opening aligned with the first foot and a second foot height adjustment opening aligned with the second foot;
   at least one foundation member spanning a distance between the first foot and the second foot, wherein the first foot, the second foot and the foundation member are configured for magnetically coupling the foundation member to the first foot and the second foot.

20. The foot system of claim 19, wherein at least one of the first foot and the second comprises a side height adjustment opening, wherein the side height adjustment opening is sized to receive a tool for adjusting a height of the foot.

21. The foot system of claim 19, further comprising a clip for coupling to at least one of the first foot or the second foot, the clip having one end configured to contact one of the first foot or the second foot, and an opposite end configured to receive a bolt.

22. The foot system of claim 21, wherein the at least one of the first foot or the second foot comprises an anchor with a threaded bore and an adjustable leveler threadedly received in the threaded bore, wherein the anchor comprises an upturned circular rim to which the clip can be coupled.

23. A foot system for supporting a cabinet, comprising:
   at least one foot having a lower end with an adjustable leveler and an upper end opposite the lower end;
   a clip having a first end configured for coupling to the foot and a second end with a mounting opening for mounting to an adjacent surface; and
   a rail for attachment to the upper end of the first foot at a predetermined attachment location, the rail having at least one opening spaced from the attachment location and sized to receive a drill bit extending from above, the at least one opening in the rail serving to align the drill bit and the mounting opening in the clip such that a bore can be drilled in the surface for mounting the clip.

24. A cabinet construction, comprising:
   at least one foot having a lower end with an adjustable leveler and an upper end opposite the lower end;
   a rail having a bottom surface for attachment to the upper end of the foot and to extend generally horizontally to at least one adjacent foot;

at least one upright panel positionable on an upper surface of the rail and supportable by the rail and the foot; and at least one free floating lateral panel positionable on the rail to extend in a generally horizontal plane.

25. The cabinet construction of claim 24, further comprising foundation members for coupling to the foot to define at a partially enclosed space extending between a supporting surface on which the foot is positioned and the upright panel in a vertical direction and extending along the foundation members in the horizontal direction, and wherein the partially exposed space is accessible by removing the free floating lateral panel.

26. The cabinet construction of claim 24, wherein the free floating lateral panel comprises at least one groove shaped to receive at least a portion of the rail.

* * * * *

UNITED STATES PATENT AND TRADEMARK OFFICE
CERTIFICATE OF CORRECTION

PATENT NO. : 9,826,834 B2  
APPLICATION NO. : 15/094918  
DATED : November 28, 2017  
INVENTOR(S) : David Anthony Hovenden et al.

It is certified that error appears in the above-identified patent and that said Letters Patent is hereby corrected as shown below:

In the Claims

Column 10, Line 5, "farther comprising" should read --further comprising--.

Signed and Sealed this  
Twenty-sixth Day of March, 2019

Andrei Iancu  
*Director of the United States Patent and Trademark Office*